United States Patent
Cunrath et al.

(10) Patent No.: US 12,194,626 B2
(45) Date of Patent: Jan. 14, 2025

(54) INSTALLATION FOR HANDLING AND STORING BIOLOGICAL SAMPLES AT VERY LOW TEMPERATURES, COMPRISING AT LEAST ONE CARTESIAN ROBOT AND ONE AT LEAST FIVE-AXIS ROBOT

(71) Applicant: IRELEC, Saint-Martin-d'Heres (FR)

(72) Inventors: Aymeric Cunrath, Le Cheylas (FR); Eric Decolin, La Pierre (FR); Vincent Diserbo, Grenoble (FR); Guillaume Hebert, La Tronche (FR); Alain Michel, Eybens (FR); Thierry Munsch, Seyssins (FR)

(73) Assignee: IRELEC, Saint-Martin-d'Heres (FR)

( * ) Notice: Subject to any disclaimer, the term of this patent is extended or adjusted under 35 U.S.C. 154(b) by 62 days.

(21) Appl. No.: 17/769,259

(22) PCT Filed: Oct. 6, 2020

(86) PCT No.: PCT/EP2020/077978
§ 371 (c)(1),
(2) Date: Jun. 23, 2022

(87) PCT Pub. No.: WO2021/073954
PCT Pub. Date: Apr. 22, 2021

(65) Prior Publication Data
US 2024/0131689 A1  Apr. 25, 2024
US 2024/0227168 A9  Jul. 11, 2024

(30) Foreign Application Priority Data

Oct. 15, 2019 (FR) ...................................... 1911493

(51) Int. Cl.
*B25J 9/02* (2006.01)
*A01N 1/02* (2006.01)
*B25J 9/16* (2006.01)

(52) U.S. Cl.
CPC ............ *B25J 9/026* (2013.01); *A01N 1/0257* (2013.01); *B25J 9/1694* (2013.01)

(58) Field of Classification Search
None
See application file for complete search history.

(56) References Cited

U.S. PATENT DOCUMENTS 9,174,790 B2  11/2015  Malin
2010/0086440 A1  4/2010  Fattinger et al.
(Continued)

FOREIGN PATENT DOCUMENTS

CN  105857937 A  8/2016
CN  106628783 A  5/2017
(Continued)

OTHER PUBLICATIONS

International Search Report issued Dec. 18, 2020 in PCT/EP2020/077978 filed Oct. 6, 2020, 2 pages.
(Continued)

*Primary Examiner* — Mark C Hageman
(74) *Attorney, Agent, or Firm* — Oblon, McClelland, Maier & Neustadt, L.L.P.

(57) ABSTRACT

An installation for handling and storing biological samples at very low temperatures includes a cartesian robot and an articulated-arm robot having at least five degrees of freedom. A biobank which uses, working jointly, a five-axis or six-axis or seven-axis robot supported by a cartesian robot which moves the five-axis or six-axis robot translationally along at least one row of storage containers, advantageously cryogenic containers each incorporating storage columns or racks with a honeycomb structure, of which the cells are able to house individual sample containers.

22 Claims, 34 Drawing Sheets

(56) References Cited

U.S. PATENT DOCUMENTS

| | | |
|---|---|---|
| 2012/0283867 A1 | 11/2012 | Gelbman et al. |
| 2018/0202908 A1 | 7/2018 | Croquette et al. |
| 2019/0293344 A1 | 9/2019 | Sun et al. |

FOREIGN PATENT DOCUMENTS

| | | |
|---|---|---|
| CN | 206427590 U | 8/2017 |
| EP | 2 169 405 A2 | 3/2010 |
| EP | 2 492 663 A2 | 8/2012 |
| FR | 3 052 230 A1 | 12/2017 |
| KR | 10-2014-0099810 A | 8/2014 |
| WO | WO 2011/047710 A1 | 4/2011 |

OTHER PUBLICATIONS

French Preliminary Search Report issued Jun. 29, 2020 in French Patent Application No. 1911493, 2 pages.

INSTALLATION FOR HANDLING AND STORING BIOLOGICAL SAMPLES AT VERY LOW TEMPERATURES, COMPRISING AT LEAST ONE CARTESIAN ROBOT AND ONE AT LEAST FIVE-AXIS ROBOT

TECHNICAL FIELD

The present invention relates to the field of installations usually referred to as "bio-banks", which allow the storage of biological samples of human, animal, plant or environmental origin at very low temperatures and in particular under cryogenic conditions, thanks in particular to liquid or gaseous nitrogen as a cold source.

The invention relates more particularly to automated bio-banks, that is to say ones in which the handling of the stored samples, the boxes ("cryoboxes") containing samples and the racks ("cryoracks") containing the boxes are carried out without the intervention of an operator.

The invention aims more particularly to improve these types of bio-bank, in particular by allowing the use of commercially available sample storage containers, such as cryo-storage containers (cryo-preservation containers), dewar-type containers, vacuum-insulated vessels or cryogenic freezers.

Although described with reference to a preferred application of using commercially available cryogenic storage containers, the invention can be applied to all types of storage containers.

In addition, although described with reference to a preferred application in which biological samples are contained in preservation tubes (cryotubes, cryovials or sample storage tubes), the invention can also be applied to storage boxes containing samples of human, animal, plant or environmental origin.

PRIOR ART

In conventional bio-banks, biological sample containers are stored in liquid-nitrogen-cooled containers (dry-phase, gas-phase or liquid-phase storage), typically in a temperature range from −150° C. to −96° C., preferably below −80° C., and their handling, that is to say their loading/unloading from a container is performed manually by an operator. The advantages of such bio-banks are minimal investment cost, and flexibility of use with little maintenance required.

However, they have significant disadvantages, such as the management of the samples, which is performed manually with the related risks of handling errors, the traceability of the samples which is not 100% reliable, and lastly, for the operators, the risks of anoxia related to the cryogenic environment (presence of liquid nitrogen), the lack of ergonomics and the level of effort required to lift the storage units from a storage container (significant weight, phenomenon of adhesion due to cold), as well as the risks of burns due to potential liquid nitrogen spray.

Various attempts to automate bio-banks have already been made.

Many patent applications disclose automated bio-bank solutions, which can be classified according to the type of robot/robotic system and sample movement system(s) implemented.

For example, there are applications for bio-banks that use carousels with push/pull cylinders.

Patent application EP2492663A1 relates to a system for receiving, storing and dispensing samples.

A cryogenic storage unit is equipped with a motorized carousel to orient a rack vertically on a motorized elevator. An actuator is used to remove or place a sample holder placed in the rack. No mention is made of how to house the samples inside the containers. The system described does not allow the retrieval of samples individually, nor the use of commercial cryo-storage containers, because the cryo-storage containers used must be adapted to be compatible with the automation system.

Some patent applications disclose bio-banks with six-axis robots.

FR3052230 describes a storage area for storing products at cryogenic temperatures, comprising a plurality of vacuum-insulated tanks and a 6-axis robot placed on an autonomous motorized carriage (guided wirelessly), which can move towards the desired tank as required. On reading this patent application, several pieces of information are missing: indeed, no explanation is given on how to retrieve the storage columns ("racks") of the cryogenic storage tanks, nor on how to retrieve the boxes containing the sample tubes to be preserved, nor on the removal of the lids of these boxes, nor on the actual gripping of the tubes. Furthermore, it is not specified how the sample tubes are transferred to a zone accessible by an operator.

US2018/0202908 discloses an automated system for retrieving samples placed on portions of disks placed inside cryogenic storage tanks having a rotating internal carousel. The samples are placed vertically on trays distributed on a disk covering the inner diameter of a cryogenic tank. A 6-axis robot, itself placed in a chamber maintained at low temperature, typically below 5° C., and in a low-humidity environment, makes it possible to take samples placed on the recovered trays.

There are also applications relating to installations with Cartesian robots.

KR2014009810 relates to a bio-bank where the retrieval of racks placed in non-standard cryogenic containers is automated using a Cartesian robot. Actuators installed on the Cartesian robot allow the sample supports housed in the handled rack to be retrieved. No handling of the sample tubes is provided in the installation since they can only be removed by hand.

WO2011/047710 describes an automated retrieval system for retrieving sample support plates stored at −90° C. The system implements a Cartesian robot, which does not allow for the use of commercial cryo-storage containers.

U.S. Pat. No. 9,174,790 relates to a system with a Cartesian robot that moves over two rows of cryo-storage containers having a rotating internal carousel, all arranged in a cold room (climate-controlled, 0° C., −20° C. or −50° C.) in an inert atmosphere. The disclosed system does not seem to be suitable for the modification of existing installations.

CN105857937 discloses a system with a Cartesian robot of which the longitudinal axis of movement is placed on the ground along a row of cryo-storage containers (tanks), and which has means for lifting sample storage columns (racks), retrieving a packaging box from a rack individually, and transferring the samples to a box intended to shuttle between the cryo-storage containers, the latter-mentioned box being accessible from the outside via a trap door. The automatic handling system which is positioned above a storage container is composed of six motorized axes, according to a combination of linear axes, placed in a housing (a priori waterproof) which can be cooled by LN2 injectors. A hydraulic actuator with a vertical axis allows the handling system (racks, boxes and samples) to be lifted and arranged on top of the selected tank. A major disadvantage of the disclosed system is that it only allows the integration of cryogenic tanks of the same size (or even the same commercial brand), because the position of the opening caps of the tanks must be strictly identical for all the tanks. The samples are handled by vacuum grips placed in line in order to collect several samples simultaneously. The racks are handled with an electromagnet, which requires the stainless steel racks to be magnetic or a ferrous element to be inserted on the top of the rack. This is therefore a design constraint. Lastly, reading the patent, it is not really possible to know how the boxes are transferred out of the racks (or in the racks) towards the transfer station.

Some patent applications disclose bio-banks with a plurality of robots.

EP2169405 discloses a biobank with a plurality of robots, one of which is mounted on a translational axis, which are dedicated to transferring samples placed on microplates. A first articulated-arm robot retrieves a microplate from a refrigerator of a freezing chamber to move the microplate into a freezing unit. The robot is further able to transfer the microplate to a processing station. In a handling station, there is arranged a second articulated-arm robot to handle microplates previously deposited by the first robot. Here again, there is no possibility to retrieve the samples at the unit or to use commercial cryo-storage containers.

US2012/283867 describes a system for automating the retrieval of plates that act as sample holders housed in a motorized carousel. A plurality of pick-and-place robots are also integrated into the system to retrieve and transfer the samples housed in the plates. The system described does not allow the use of commercial cryo-storage containers.

CN106628783 describes a system comprising a Cartesian robot with two 6-axis robots each moving over one of two rows of cryo-storage containers (tanks), all arranged in a room in which the temperature is controlled down to −40° C. Each 6-axis robot is equipped with a dedicated gripper. One of the 6-axis robots is dedicated to the gripping of the tank caps, to the handling of a dewar-type container intended to be shuttled. The shuttle container is placed near the selected tank from which the operator wishes to recover samples. The other 6-axis robot is dedicated to the handling of towers containing samples via a complex suction system. The plates that hold the sample towers are referred to as honeycomb structures.

Although automation brings significant advantages such as the guarantee of traceability of samples on a database, and the safety of operators and handling operations, the automated bio-banks already proposed have major drawbacks.

First of all, they require a very high investment in purchase, operation and maintenance, due to the fact that they are custom-designed for each configuration, with the impossibility of reusing existing standard equipment, such as standard storage containers.

Secondly, their design means that their temperature range is restricted, with many being unable to reach cryogenic temperatures, typically below −150° C.

Lastly, as mentioned, their custom design means that they are dedicated to a single configuration, which does not allow them to be upgraded.

Thus, there is a need to improve the installations for handling and storing biological samples, or bio-banks, moreover in particular by overcoming the disadvantages of both conventional bio-banks in which the handling of samples is performed manually and the automated bio-banks already proposed.

In general, there is a need for a bio-bank that is fully automated for the management and protection of a large number of samples, kept in commercial storage containers (cryo-storage containers), at a lower cost than known installations, with complete traceability of the samples, that leaves the possibility at all times to manage the samples in manual mode, in order to facilitate maintenance, and to keep a certain flexibility and that can be scalable, especially in case of an increase in samples to be kept.

In general, there is also a need for a bio-bank that makes it easier and faster to store and retrieve biological samples.

The objective of the invention is to satisfy this need/these needs at least in part.

DISCLOSURE OF THE INVENTION

To this end, the invention relates, in one of its aspects, to an installation for handling and storing biological samples at very low temperatures, in particular under cryogenic conditions, comprising:
 a plurality of storage columns, each extending along a longitudinal axis and having a structure adapted to receive translationally and to house a plurality of containers each adapted to contain one or more biological samples of human, animal, plant or environmental origin;
 a plurality of thermally insulated storage containers aligned in at least one row, the interior of each container being able to be subjected to very low temperatures, each container comprising in its upper part a honeycomb grid, each cell of which is adapted to receive vertically one of the plurality of storage columns;
 a first gripping member, adapted to grip a storage column individually;
 an articulated-arm robot with at least five degrees of freedom, said robot having at least five axes, the robot arm being adapted to move in any position within a circular zone of movement, the end of the robot arm being provided with a second gripping member, adapted to grip a container or a multi-compartment storage box individually, each compartment being able to house a container;
 a first Cartesian robot, arranged above the row(s) of storage containers, the first Cartesian robot having at least two axes: a longitudinal movement axis, which is parallel to the direction of alignment of the row(s), and a vertical movement axis; the first Cartesian robot being adapted to carry and move, along its longitudinal movement axis, the at least five-axis robot, and to carry and move vertically, the first gripping member.

The installation is configured so that:
i/ the first Cartesian robot can move the at least five-axis robot in the vicinity of any of the storage containers,
ii/ the first gripping member retrieves vertically at least partially any one of the columns from one of the cells of the storage container grid in a so-called pick-up position,
iii/ the second gripping member retrieves at least one selected container in the pick-up position of the column,
and vice versa.

The term "vice-versa" means here and in the context of the invention that the operations of the installation and in particular the operations i/ to iii/ can be carried out in the reverse direction, with a view to storing a sample container in any of the storage containers of the installation.

The articulated arm can have five, six or seven degrees of freedom, with the robot then being referred to, respectively, as a five-, six- or seven-axis robot.

Thus, the invention consists substantially of a bio-bank which implements jointly a five- or six- or seven-axis robot carried by a Cartesian robot which moves the five- or six-axis robot translationally along at least one row of storage containers, advantageously cryogenic storage containers (cryo-storage containers) each integrating storage columns or racks with a honeycomb structure of which the cells are able to house sample containers individually.

The use of a Cartesian robot with a 5-, 6- or 7-axis robot arm gives the installation sufficient flexibility to be able to use current commercial cryo-storage containers, regardless of whether they are fully or partially open.

This combined implementation of a Cartesian robot and a 5-, 6- or 7-axis robot makes it possible to obtain a simple and reliable automated installation (few mechanical or electrical components).

The robotic part of the installation ensures the traceability and the preservation (cold-chain conservation) of the samples.

The first Cartesian robot performs the following main positioning operations:
  moving the first gripping member to the selected storage container;
  moving the first gripping member to the selected storage column in the selected container:
  moving the robotic arm (5, 6 or 7 axis robot) to an area with a loading/unloading airlock (docking zone) for the sample containers.

The first Cartesian robot can also perform the following main operations with the first gripping member:
  retrieval, placement, release and recovery the lids of the storage containers which are partially opened, in case the opening of the lids of the storage containers is not automated by means of cylinders,
  retrieval and placement of the racks out of the storage containers by vertical translation.

Retrieval from a selected rack may not be complete, that is to say a portion remains inside the storage container during retrieval of a selected sample container. In other words, depending on the position of the selected sample in the rack, it will be pulled out of the storage container enough to allow the robotic arm to access the desired sample.
  preferably clamping of the rack retrieved from the container by means of the clamping device as described below.

The 5-, 6- or 7-axis robot arm allows the following main operations to be carried out with the help of the second gripping member:
  retrieval of the sample containers from the racks and placement of said containers in the boxes placed in the transfer tray carried by the longitudinal movement axis of the first Cartesian robot.

The 5-, 6- or 7-axis robot can advantageously be guided visually (camera installed on the robot) or by laser, particularly during the phase of recovery or placement of the sample containers in the racks.
  retrieval of the sample containers from the storage boxes placed in the transfer tray and placement in the racks;
  preferably, positioning of the sample container relative to a data reader to verify the identification of said container.

The gripping members are preferably each provided with a compliance member in the three axes X, Y and Z with return springs to allow automatic re-centering.

Advantageously, the second gripping member, which is carried at the end of the 5-, 6- or 7-axis robot, can be equipped with an anti-collision system and/or a laser positioning/learning system and/or a camera and its LED lighting system which controls the robot by indicating the target position.

Advantageously, the storage containers are aligned in two parallel rows delimiting a space in which the longitudinal movement axis/axes of the first Cartesian robot is/are arranged.

According to a first advantageous embodiment, the structure of each storage column is a honeycomb structure of which the cells extend along an axis intersecting the longitudinal axis, each cell of a storage column being adapted to receive and house one of the plurality of containers individually;
  the second gripping member is adapted to grip a container individually.

The installation is configured so that iii/the second gripping member retrieves any of the selected containers individually in the column pick-up position.

According to this first embodiment, the containers are therefore stored and retrieved individually in a cell of the honeycomb structure of a storage column, usually referred to as a "rack". The cells can be round, hexagonal, square, triangular or any polynomial shape. The dimensions of the racks are adapted to the geometry of the sample containers being handled, taking into account the differential contraction of the samples and the cells of the racks. The cells can be horizontal or inclined to the vertical so that they can be stored at an angle, which facilitates the holding of the sample containers in the rack. With such a honeycomb structure with single storage cells, only the sample containers are stored. In this embodiment, there is no need to provide storage boxes in which the samples are placed, which simplifies automation.

According to this first embodiment, it is advantageous to provide a clamping device, carried by the vertical movement axis of the Cartesian robot, the clamping device being adapted to clampingly hold a storage column when the latter is at least partially retrieved from a storage container. The clamping device preferably consists of a main linear cylinder to which a gripper, of the pneumatic type, equipped with two jaws is attached. The main cylinder makes it possible to place the gripper close to the storage column (rack) or to move away from it when it is to be moved vertically. When the rack is in the desired vertical position, said to be the position of "proximity", the two-jaw gripper is activated and clamps the rack.

A retrieval device, carried by the vertical axis of movement of the Cartesian robot, may be further provided, the retrieval device being adapted to push any container from a cell of a storage column when said container is at least partially retrieved from a storage container.

Preferably, the retrieval device comprises one or more cylinders as pushing means, which make it possible to push the sample containers housed in the cells in order to facilitate their retrieval. The cylinders may be, but are not limited to, cylinders of the pneumatic, hydraulic or electric type.

According to a second advantageous embodiment:
  the structure of each storage column is divided into a plurality of storage drawers, each adapted to receive translationally a plurality of multi-compartment storage boxes, each compartment being adapted to house a container, in each case adapted to contain a biological sample or samples; the second gripping member is adapted to grip a storage box individually;

the installation is configured so that iii/ the second gripping member retrieves any of the selected storage boxes individually in the column pick-up position.

According to an advantageous embodiment, the first Cartesian robot is a three-axis robot, the third axis being a lateral movement axis adapted to laterally move the first gripping member at least in line with any cell of the grid of any of the storage containers.

The use of a third horizontal movement axis, orthogonal to the longitudinal movement axis, makes it possible to position the first gripping member at the various positions of the columns and thus cover all the locations of all the cells of the grid.

According to an advantageous embodiment, the installation comprises:
  at least one transfer tray, carried by the longitudinal movement axis of the first Cartesian robot and arranged in the circular movement zone of the five- or six-axis robot, the transfer tray being adapted to house a plurality of storage boxes.
  a preparation station from which an operator can bring one or more containers or multi-compartment boxes, the installation being configured so that the longitudinal movement axis of the first Cartesian robot can move the transfer tray in the preparation station.

According to an advantageous variant, the preparation station comprises a second Cartesian robot with at least two axes, adapted to bring the containers or boxes into an airlock for the recovery of biological samples by an operator. The Cartesian robot of the preparation station makes it possible to perform the following main preparation operations:
  moving the transfer boxes manually placed by the operator on a loading drawer to a static transfer tray (cold storage of the boxes and the positioned sample containers);
  moving the transfer boxes between the static transfer tray and the transfer tray carried by the first Cartesian robot.

Thus, sample boxes are transferred directly between the Cartesian robot of the preparation station and the operator by a loading drawer, which makes it possible to avoid the implementation of a mobile conveyor.

According to an advantageous variant, measurement instrumentation means are provided on each storage column structure.

Preferably, the instrumentation means comprise at least one temperature sensor and/or at least one strain gauge and/or a radio-frequency identification (RFID) means and/or a transponder, preferably of the MEMS (MicroElectroMechanical System) type.

Preferably, at least two temperature sensors can be arranged per storage column, one arranged at one longitudinal end and the other arranged at the opposite longitudinal end.

The temperature measurement can be performed wirelessly. The temperature measurement of the upper face of the storage column (rack) is preferably carried out when the first gripping device, mounted on the vertical axis of the first Cartesian robot, is in contact with the desired rack. The temperature reading then makes it possible to authorize, or not, the exit of the rack according to the temperature measured on the latter. The temperature reading of a second temperature sensor arranged on the lower face of the rack, or preferably a third temperature sensor arranged in the middle of the rack (lateral face), makes it possible to have a thermal mapping of the racks, especially when they are placed outside the storage containers. The temperature readings will make it possible to preserve the integrity of the samples by imposing that the rack is placed inside the storage container, when its temperature, in particular that measured on the upper face, approaches the maximum admissible temperature. On the other hand, the temperature readings will make it possible to know the temperature gradients and the thermal contractions undergone by the rack, moreover in a dynamic way, because the temperature readings will be acquired as long as the first gripping member is in contact with the rack. This information allows the robot to be guided by integrating compensation coefficients linked to thermal contraction, particularly during the phase of retrieval or placement of samples in the racks.

Advantageously, the installation comprises a floor or ceiling frame that carries the first Cartesian robot or a gantry that carries the first Cartesian robot, suspended above the row(s) of storage containers.

Advantageously, the utilities, such as fluids (liquid nitrogen, air, water, etc.), pneumatic, electrical and even hydraulic supplies, which may already be in place in the premises of the entities managing bio-bank-type installations, can be placed under the frame of the installation according to the invention.

The choice of a floor frame or a gantry depends on the environment around the installation. The frame or gantry can be a machine-welded assembly or made of profiles, typically aluminum or steel, placed between the rows of storage containers.

According to an advantageous variant, the installation comprises an enclosure with a controlled environment (gaseous atmosphere and/or hygrometry and/or controlled temperature) comprising secure access, in particular to the preparation station for an operator from the outside, the enclosure being configured to house the plurality of storage containers and boxes, the plurality of storage columns, the storage containers, the at least five-axis (five- or six- or seven-axis) robot, the gripping members, the Cartesian robot(s) and, if necessary, the frame or the gantry. This enclosure makes it possible to maintain an inert atmosphere (for example with nitrogen), to maintain a low hygrometry rate and to control the temperature inside the enclosure.

Advantageously, the storage container(s) comprise(s) (in each case) a lid to close the container(s) which is (are) in storage configuration, that is to say not concerned by the retrieval or, conversely, the insertion of a column therein.

Further advantageously, the control unit of the first Cartesian robot is adapted to control the opening and conversely the closing of each storage container.

The containers are preferably storage tubes (cryotubes, cryovials or sample storage tubes).

Preferably, the storage container(s) operate under cryogenic conditions, in particular with liquid nitrogen as a cold source. As already mentioned, the containers may be existing cryo-storage containers of different commercial brands. In the same installation according to the invention, there can be storage containers of different sizes, with total or partial opening (wide-opening neck or narrow neck). The cryo-storage containers are equipped with a honeycomb grid to position the storage columns (racks). Full-opening cryo-storage containers are equipped with a pneumatic cylinder for automatic opening and closing. The caps of the partial-opening cryo-storage containers are modified to allow their automatic opening.

Advantageously, storage containers can be provided with a ventilation system to reduce any thermal gradient. For example, fans can be placed on the free portions of the honeycomb grid dedicated to the holding of the racks.

The advantages of an installation according to the invention are numerous and include:

reuse of existing storage means (cryo-storage containers) with the possibility of adapting to different sizes of cryo-storage containers, different types of commercial cryo-storage containers, with total or partial opening;

flexibility and modularity:
- possibility to adapt to the number of cryo-storage containers used (longer or shorter system);
- possibility to adapt to the size of the cryo-storage containers used (wider or narrower system and higher or lower);
- possibility to adapt to the environment of the implantation room (adaptable to the height of the ceiling, the location of the cold lines to feed the cryo-storage containers or the spacing between the containers.

low amount of work required to robotize an existing bio-bank, with the possibility to install the cold lines feeding the cryo-storage containers on top of the suspended gantry or under the ground frame of the Cartesian movement robot;

simplicity of operation:
- the operator loads one (or more) conventional storage boxes ("cryo-boxes") in which there are placed containers, preferably tubes ("vials") containing the biological samples to be stored in the cryogenic containers;
- the racks contain only the containers of biological samples placed in the cells of a honeycomb structure;

better conservation of the cold chain (cold atmosphere), fight against frost (dry atmosphere) and preservation of the samples than according to the prior art, thanks in particular to the instrumentation of the racks with integrated temperature sensors which makes it possible to control the temperature of the racks and thus those of the samples with an immediate replacement of the racks in a cold environment in the cryo-storage containers when the temperature of a retrieved rack approaches the maximum admissible temperature scalability of the installation, by adapting the number of cryo-conservers, the dimensions and the movement paths of the first Cartesian robot as desired. For example, the longitudinal movement path of the Cartesian robot can be lengthened if the number of cryo-storage containers increases.

For example, the height of the Cartesian robot can be adapted to the height of the ceiling by using a telescopic Z-axis.

possibility at any time to manage the installation in manual mode, in order to facilitate maintenance, and to keep a certain flexibility.

It is also an object of the invention to use the installation as described above to store biological samples under cryogenic conditions in an environmentally controlled enclosure.

Other advantages and features of the invention will become clearer upon reading the detailed description of exemplary embodiments of the invention provided by way of illustration and without limitation with reference to the following figures.

DETAILED DESCRIPTION

Throughout this application, the terms "lower", "middle", "upper", "top", "bottom", "inside", "outside" are to be understood with reference to a vertically arranged storage container and storage column of the installation according to the invention.

FIGS. 1, 1A, 2 and 2A show all the essential components of an installation 1 for handling and storing biological samples at very low temperatures, in particular under cryogenic conditions, according to the invention.

The biological samples are contained in containers. The biological samples can be of human, animal, plant or environmental origin.

In the illustrated example, the sample containers 10 implemented are commercially available storage tubes already in use (cryotubes, cryovials or sample storage tubes).

Figure 5:
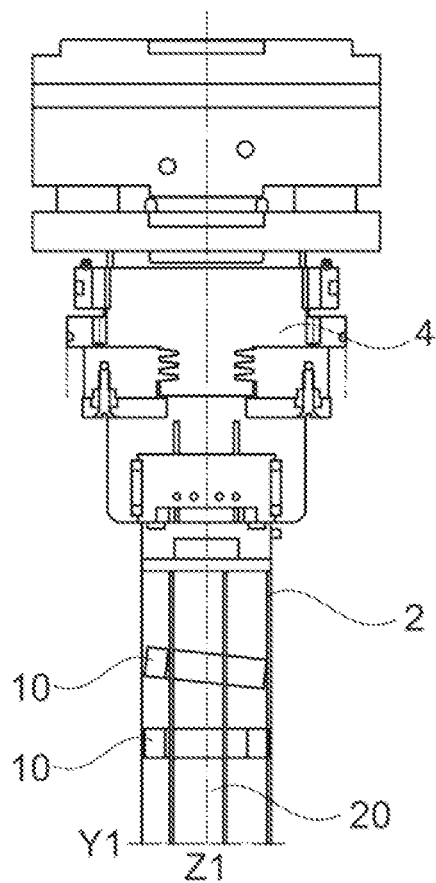
FIG. 5 is a longitudinal sectional view showing the detail of a structure of a rack according to the invention as gripped by the first gripping member of the installation.

The installation 1 comprises storage columns 2 or racks. As shown in FIGS. 3, 3A, 4 and 5, a storage column 2 extends along a longitudinal axis Z1 and has a honeycomb structure 20. Each cell 200 can receive a sample container (tube) 10 translationally, transverse to the longitudinal axis Z1. The cells 200 can be round, hexagonal or square, triangular or any polynomial shape. The dimensions of the cells are adapted to the geometry of the sample containers (tubes) 10 being handled as well as to thermal contractions. The axis Y1 of the cells can be a horizontal axis or inclined to the vertical so that they can be arranged at an angle which facilitates holding of the sample tubes 10 in the rack 2 (FIG. 5).

The installation 1 comprises at least one row, two in the illustrated example, of commercially available storage containers 3.1 to 3.10, referred to as cryo-storage containers. These cryo-storage containers can be cryo-preservation containers, dewar-type containers, vacuum insulated tanks or cryogenic freezers. These containers are thermally insulated, their interior being able to be subjected to very low temperatures, in particular with liquid nitrogen being arranged as a cold source. Each container 3.1 to 3.10 can be of the double-walled type, in which a vacuum is created to guarantee thermal insulation with the outside.

Figure 1:
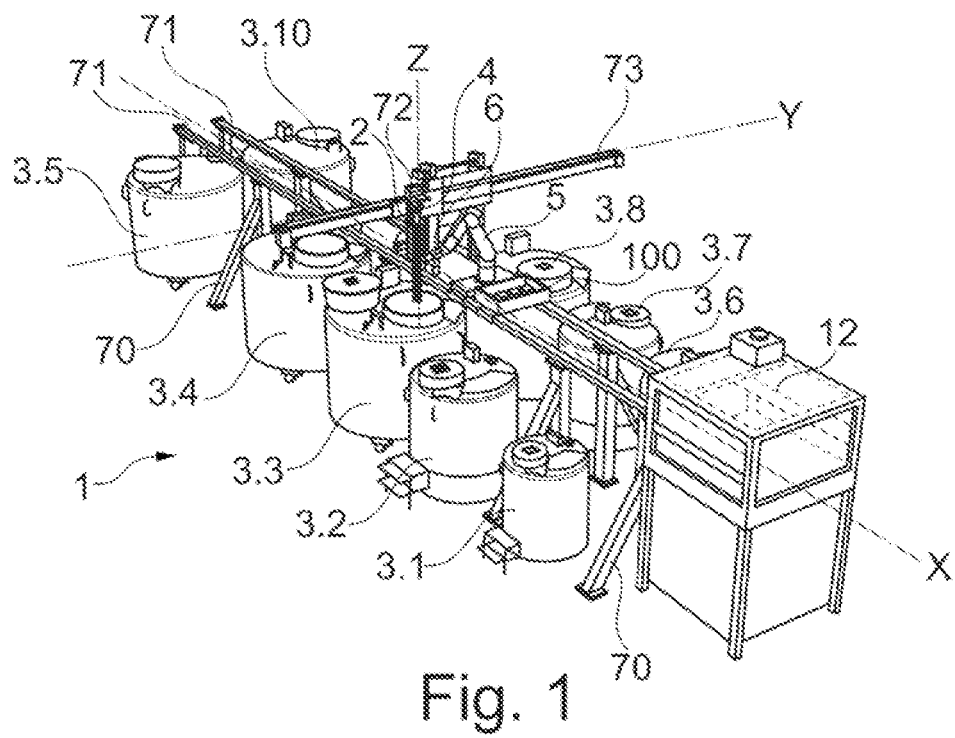
FIG. 1 is a perspective view of an example of a cryogenic biological sample handling and storage installation according to the invention.
Figure 1A:
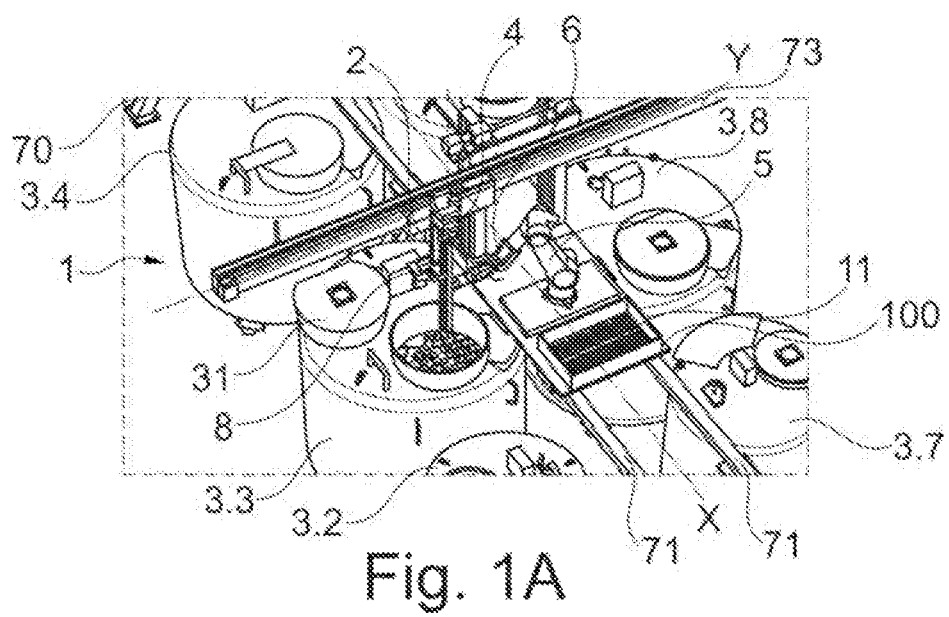
FIG. 1A is a perspective detail view of FIG. 1, showing components of the installation during retrieval of a storage column (rack) from a cryogenic storage container (cryo-storage container).
Figure 2:
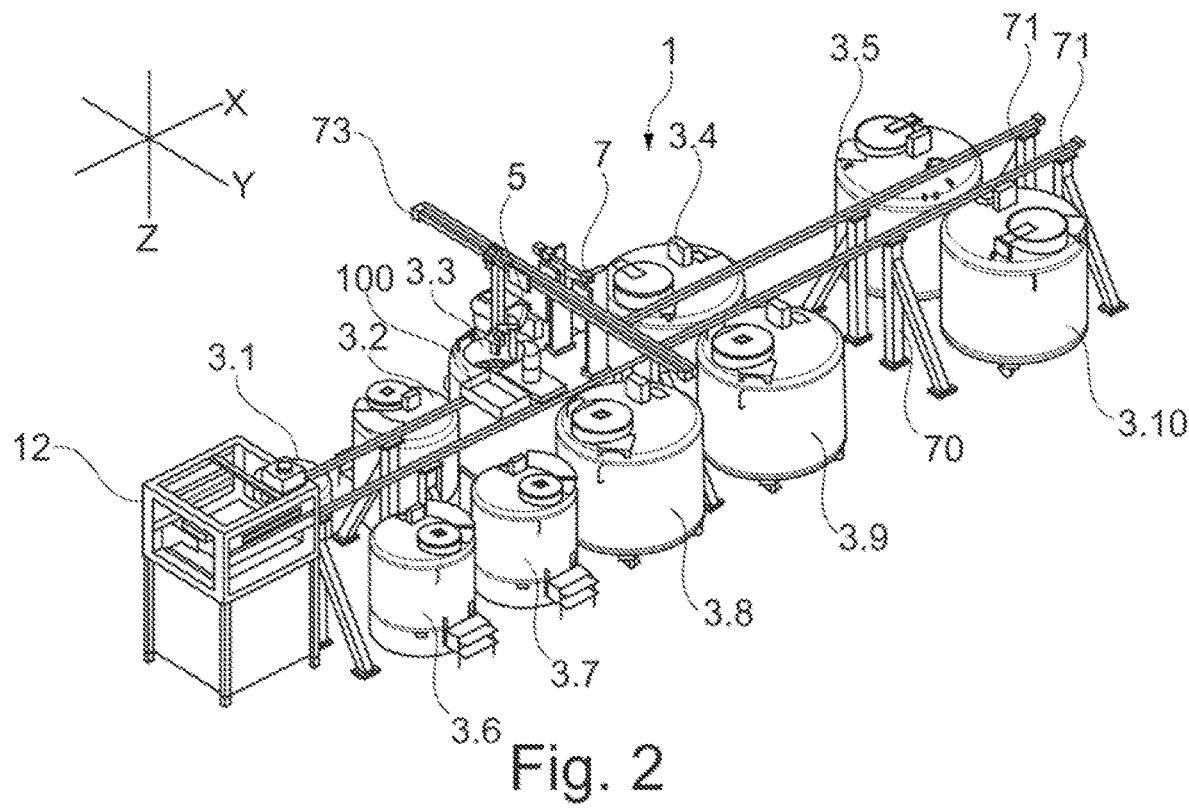
FIG. 2 is another perspective view of an example of a cryogenic biological sample handling and storage installation according to the invention.
Figure 2A:
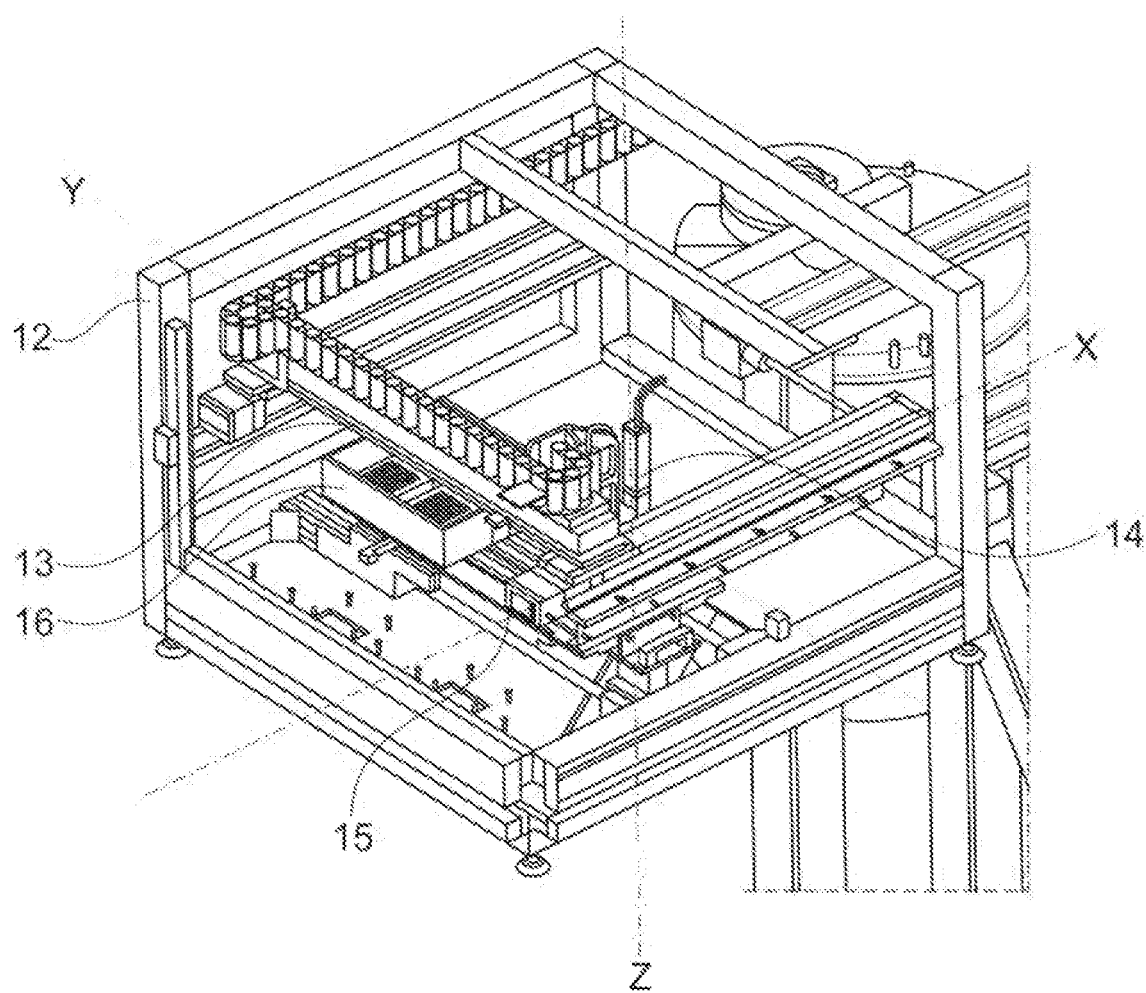
FIG. 2A is a perspective detail view of FIG. 2 showing the preparation station of the installation.

Preferably, the containers 3.1 to 3.10 are fixed to the ground. As shown in FIGS. 1 and 2, the storage containers can be of different sizes. They may have a full- or partial-opening, that is to say can be wide-necked or narrow-necked cryo-storage containers.

Figure 1B:
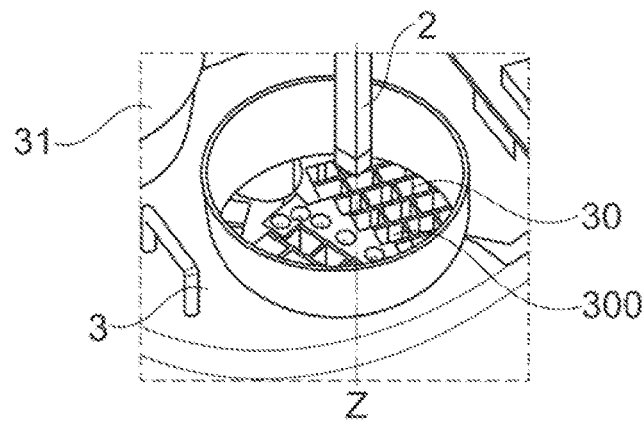
FIG. 1B is an enlarged view of FIG. 1A.

As can be seen best in FIG. 1B, each container 3 comprises in its upper part a honeycomb grid 30, each cell 300 of which can receive vertically a storage column 2. Each container 3 is closed by a removable lid 31.

The installation 1 according to the invention comprises an enclosure with a controlled environment (gaseous atmosphere, hygrometry, temperature), not shown, in which all the essential components are housed.

The installation 1 comprises a first gripping member 4, adapted to grip a storage column 2 individually.

A multi-axis robot 5 (five to seven axes) is provided for handling the sample containers (tubes) 10 placed in the racks, as well as for moving the sample containers (tubes) or the storage boxes 11 containing them from or to the user interface station 12. In the illustrated example, the multi-axis robot 5 is a 6-axis robot.

The end of the arm of the multi-axis robot is provided with a second gripping member 6, adapted to grasp individually a container 10 or a storage box 11 with multiple compartments, each compartment being adapted to house a container 10. Advantageously, the installation can be configured so as to adapt the gripping member 6 according to the element to be handled.

The installation 1 also comprises a first Cartesian robot 7, arranged above the rows of storage containers 3.1 to 3.10 and comprising the six-axis robot 5 and a transfer tray 100, preferably cooled by liquid nitrogen, on the same plate. The transfer tray 100 contains the storage box bottoms 11 required for placing or picking up the samples. The capacity of the transfer tray, that is to say the number of boxes 11, can be adapted.

A ground frame 70, formed by a machine-welded assembly or made of profiles, supports the first Cartesian robot 7 above the rows of storage containers 3.1 to 3.10.

The first Cartesian robot 7 with three movement axes (X, Y, Z) allows the six-axis robot 5 and the transfer tray 100 to be moved longitudinally along the rows of storage containers 3.1 to 3.10, but also laterally in order to access the various racks 2, and lastly vertically in order to carry and move the first gripping member vertically in order to retrieve or replace the racks in the containers 3.1 to 3.10. Thus, the longitudinal movement axis X of the Cartesian robot 7 is parallel to the alignment direction of the row(s) and the movement axis Z is vertical.

The horizontal movement axis can advantageously be constituted by two translation rails 71, 71 arranged in the space between the two rows of storage containers 3.1 to 3.10. The vertical movement axis can be advantageously constituted by two independent motorized translation axes 72 or can be of telescopic type, in order to reduce the vertical space requirement, in the case where the height of the ceiling in situ is limited.

The lateral movement axis 73 allows the first gripping member 4 to be laterally moved at least in line with any cell 300 of the grid 30 of any of the storage containers 3.

All movement axes can be formed by translation axes with ball screw or belt drives, which can be supported by brushless or DC motors. The movement axes can also be formed by linear motors ("Direct-Drive Linear Stage" motors).

According to the invention, the installation is configured such that:
  i/ the first Cartesian robot 7 can move the six-axis robot 5 in the vicinity of any of the storage containers 3.1 to 3.10;
  ii/ the first gripping member 4 retrieves vertically, at least partially, any of the racks 2 from one of the cells of the grid 30 of the storage container in a so-called pick-up position,
  iii/ the second gripping member 6 retrieves at least one selected container in the column pick-up position, and vice versa.

Figure 6:
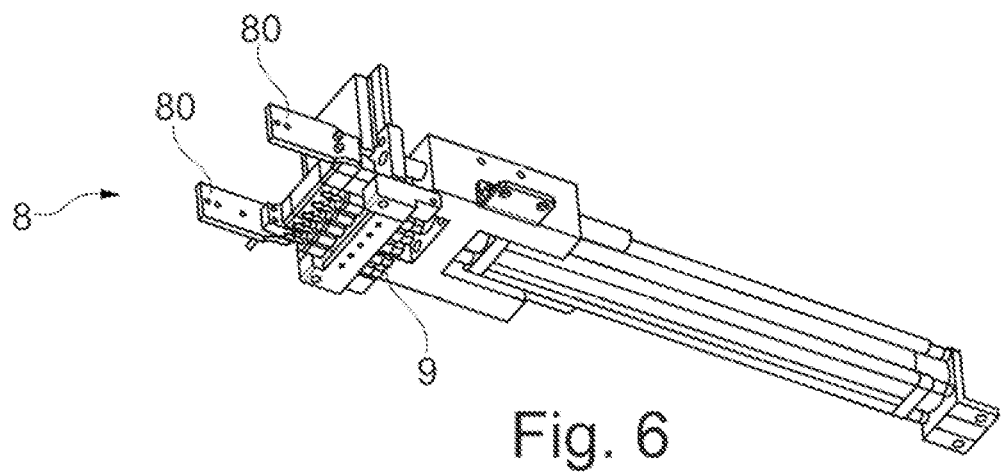
FIG. 6 is a perspective view of a clamping and retrieval device for clamping a rack and retrieving the sample tubes housed therein, respectively.
Figure 6A:
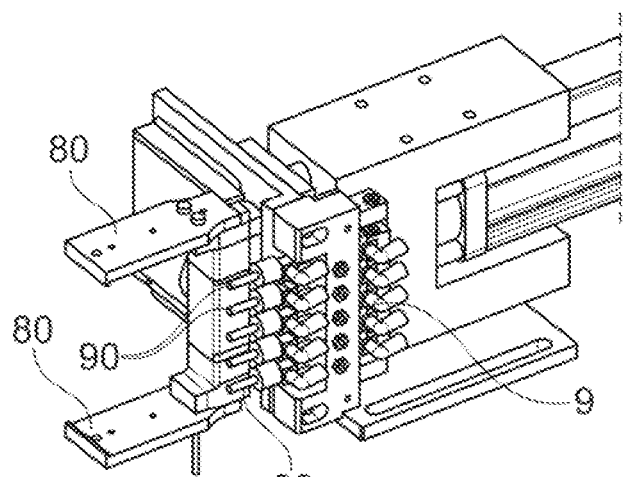
FIG. 6A is a detailed perspective view of the clamping and retrieval device according to FIG. 6.
Figure 7A:
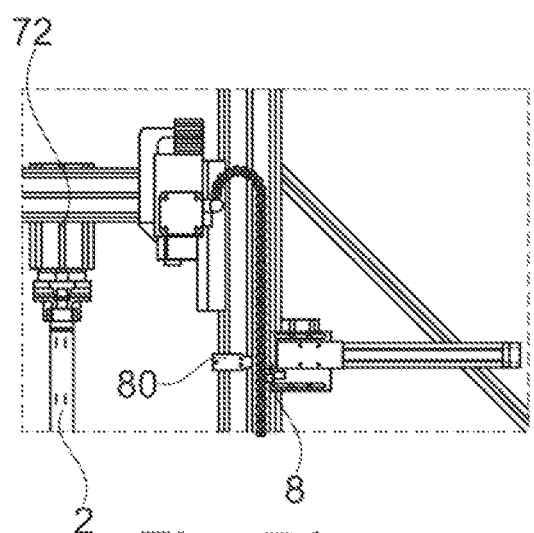
FIG. 7A is a side view showing the clamping device according to FIGS. 6 and 6A, in a position retracted from a rack gripped by the first gripping member.
Figure 7B:
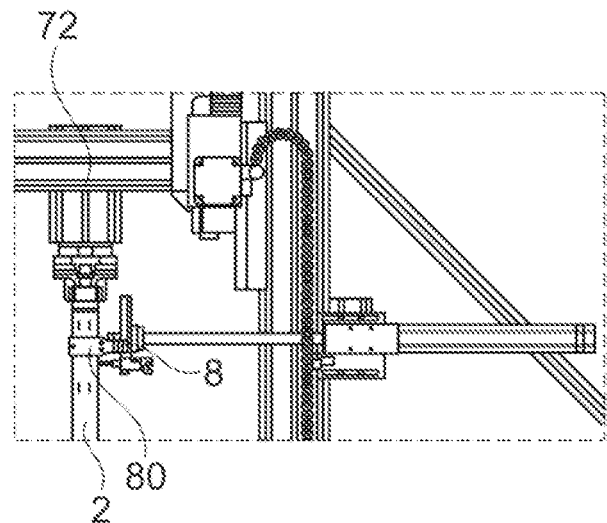
FIG. 7B is a side view showing the clamping device according to FIGS. 6 and 6A, in a position for clamping a rack gripped by the first gripping member.

The installation 1 can include a clamping device 8 and retrieval device 9, as shown in FIGS. 6 and 6A, which is carried by the vertical movement axis 72 of the Cartesian robot 7. The clamping device is used to hold, by its jaws 80, a rack 2 when the latter is at least partially removed from a storage container 3. FIGS. 7A and 7B show, respectively, the clamping device in a retrieval position at a distance and in the clamping position of the rack 2 gripped by the gripping member 4.

Figure 8A:
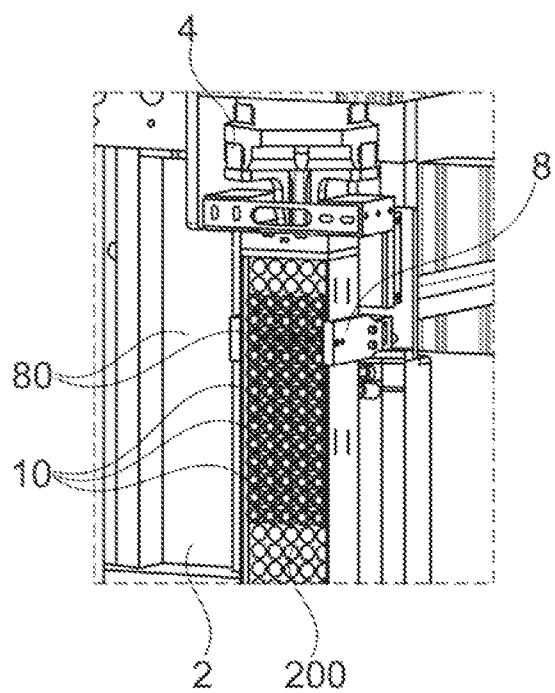
FIG. 8A is a perspective view showing the clamping device according to FIGS. 6 and 6A, in the open position of its jaws for clamping a rack gripped by the first gripping member.
Figure 8B:
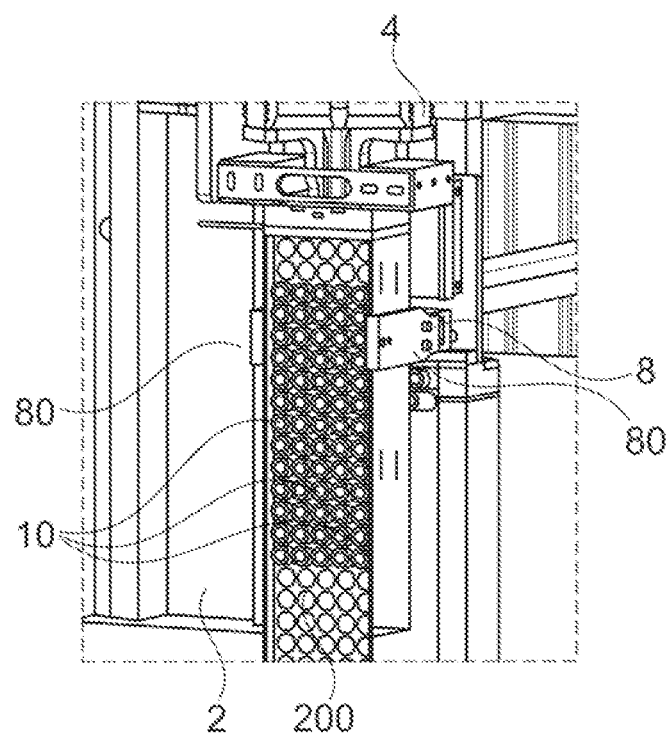
FIG. 8B is a perspective view showing the clamping device according to FIGS. 6 and 6A, in the closed position of its jaws for clamping a rack gripped by the first gripping member.

FIGS. 8A and 8B show respectively the open and closed position of the jaws 80 around the rack 2 which is gripped by the first gripping member 4.

The retrieval device 9 formed by retrieval fingers 90 actuated by cylinders, typically pneumatic cylinders, allows any tube 10 to be pushed from a cell 200 of a storage column 2 when the latter is at least partially retrieved from a storage container.

Figure 9:
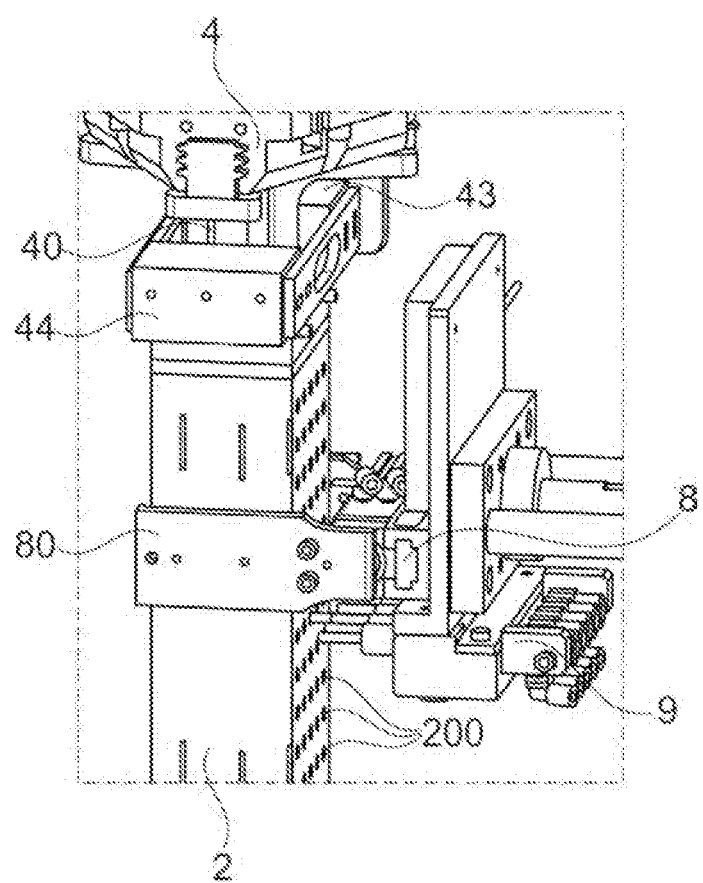
FIG. 9 is a perspective view showing the retrieval of a sample tube from its housing in a rack by pushing by a finger of the retrieval device.
Figure 9A:
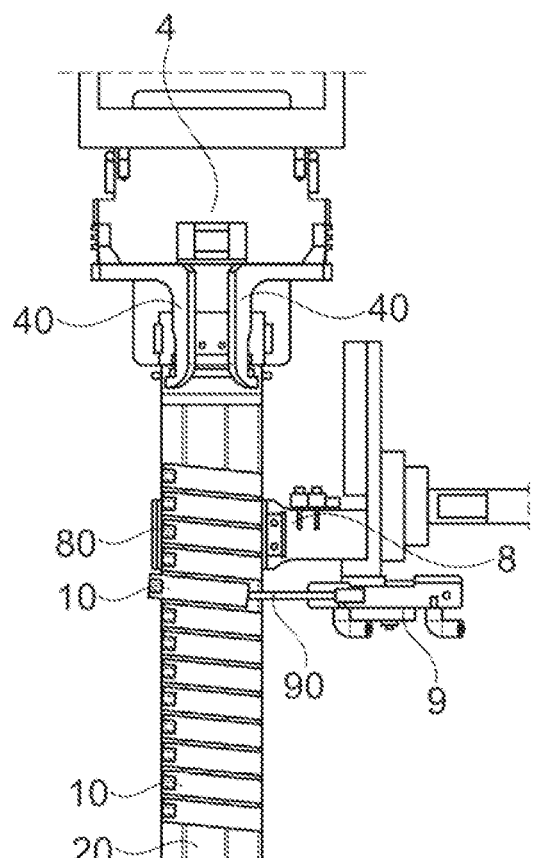
FIG. 9A is a longitudinal sectional view of FIG. 9.

FIGS. 9 and 9A show the retrieval, from its housing 200 in a rack 2, of a sample tube 10 which is performed by pushing by a retrieval finger 90.

A transfer tray 100, carried by the longitudinal movement axis X of the first Cartesian robot 7 and arranged in the circular movement zone of the six-axis robot 5, is intended to house a plurality of multi-compartment storage boxes 11 of sample tubes 10.

At one end of the longitudinal movement axis X of the first Cartesian robot 7 there is arranged a preparation station 12 from which an operator can bring one or more containers 10 or one or more boxes 11.

The longitudinal movement axis of the first Cartesian robot 7 can move the transfer tray 100 in the preparation station 12.

The preparation station 12 can comprise a second Cartesian robot 13 with three axes of movement, adapted to bring the containers 10 or the boxes 11 into an airlock for the recovery of biological samples by an operator.

This second Cartesian robot 13 carries, on its vertical axis Z, a third gripping member 14 adapted to handle the storage boxes 11 individually and, on its lateral axis Y, a loading drawer 15.

Lastly, a static transfer tray 16 that can hold storage boxes 11 is housed in the preparation station 12.

Figure 3:
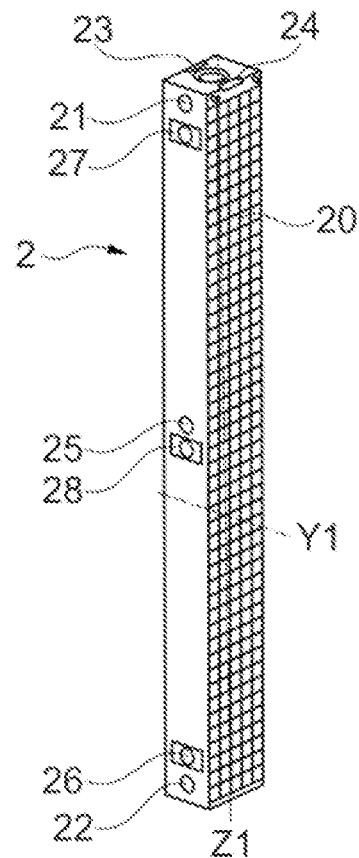
FIG. 3 is a perspective view of a rack according to the invention.
Figure 3A:
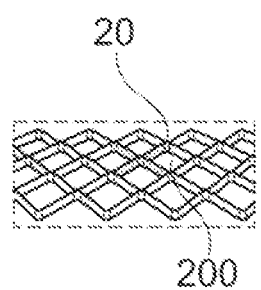
FIG. 3A is a detail view of the honeycomb structure of a rack according to FIG. 3.
Figure 4:
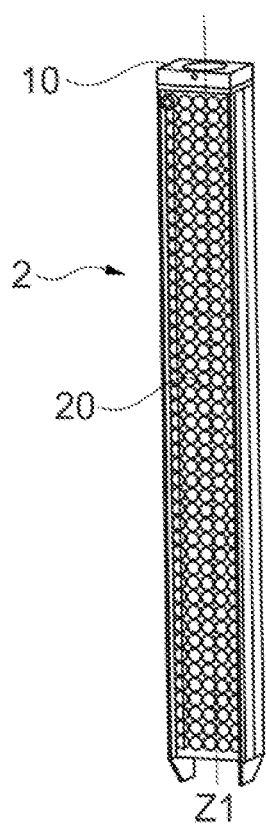
FIG. 4 is another perspective view of a rack according to the invention.

As illustrated in FIG. 3, each rack 2 advantageously comprises at least two wireless temperature measurement sensors, one of which 21 is arranged on an upper face of the rack and the other 22 is arranged on the lower face. The sensors 21, 22 are connected by cables to an electronic printed circuit board (PCB) which can be individualized, i.e., one electronic printed circuit board 23, 24 per sensor 21, 22 respectively. The temperature measurement of the upper face of the rack is only carried out when the gripping member 4, which is mounted on the vertical axis of the Cartesian robot 7, is in contact with the desired rack (FIG. 7). This can be implemented by touch points arranged on the gripper. The temperature reading makes it possible to authorize, or not, the exit of the rack according to the temperature measured on the rack. The temperature reading of the second temperature sensor 22, or of a third temperature sensor 25 placed in the middle of the rack, makes it possible to provide a thermal map of the racks, especially when they are placed outside the containers 3. The temperature readings thus make it possible to preserve the integrity of the samples by requiring that the rack be placed inside its container 3 when the temperature of the rack, in particular measured by the sensor 21, approaches the maximum admissible temperature. On the other hand, the temperature readings make it possible to know the temperature gradients and the thermal contractions undergone by the rack 22, moreover in a dynamic way. Indeed, the temperature readings can be acquired as long as the gripping device 4 is in contact with the rack 2. This information makes it possible to guide the multi-axis robot 5 by integrating compensation coefficients related to the thermal contraction, in particular at the time of the phase of retrieval or placement of the samples in the racks.

Also as illustrated in FIG. 3, the rack 2 can be equipped with complementary means and/or instead of the temperature sensors 21, 22, 23: thus, strain gauges or RFID tags 26, 27, 28 can be fixed, which can integrate temperature sensors, preferably respectively in the lower, upper and middle part of the rack 2.

Figure 10:
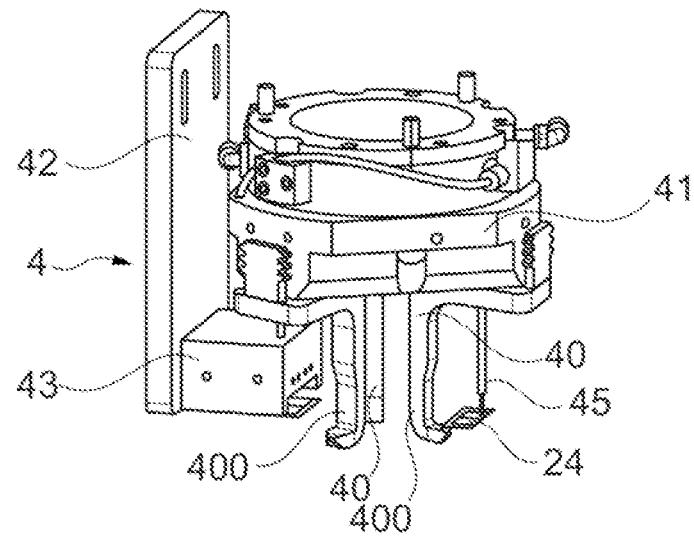
FIG. 10 is a perspective view of the first gripping member of the installation according to the invention.
Figure 11:
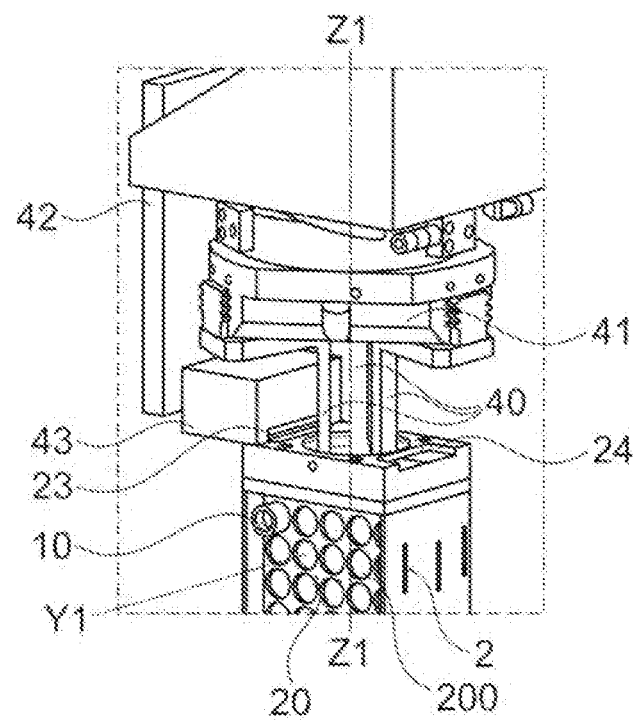
FIG. 11 is a partial perspective view showing the retrieval of a rack by the first gripping member.
Figure 12:
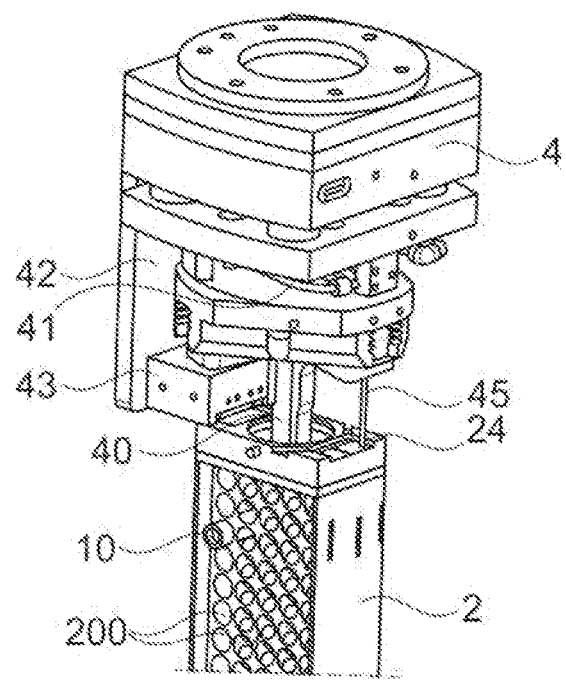
FIG. 12 is a perspective view showing the retrieval of a rack by the first gripping member with the implementation of the compliance of the latter.

An example of a gripping member 4, carried by the vertical axis of the Cartesian robot 7 is shown in FIGS. 10 to 12. It comprises a grip with one or more gripping arms 40, in the form of jaws, advantageously three in number and arranged at 120° to each other.

In order to grip a storage column 2, the arms 40 of the grip are spread apart from each other, the gripping lugs 400 then lock into the corresponding hollow part in the upper part of the column 2 (FIG. 11).

In order to compensate for positioning errors and geometric variations of the parts along the X, Y and Z axes (manufacturing tolerances of the tubes 10, boxes 11 and rack plates 2), the gripping member 4 also comprises a force-free compliance module/body 41, preferably of the type with integrated return springs, arranged above the arms of the grip. The implementation of the compliance module 41 is shown in FIG. 12.

As shown in FIGS. 10 to 12, the support of the gripping member 42 advantageously supports at least one support box 43, 44 for touch points in which one or more touch points 45 are held which, when the rack 2 is gripped by the gripping member 4, will come into contact with one and/or other of the two electronic printed circuit boards 23, 24 of the rack 2. These contacts, known as touch points, make it possible to ensure the reading of the temperatures respectively measured by the sensors 21 and 22 and possibly 23 or the sensors 26, 27, 28 integrated in the RFID labels.

Figure 13:
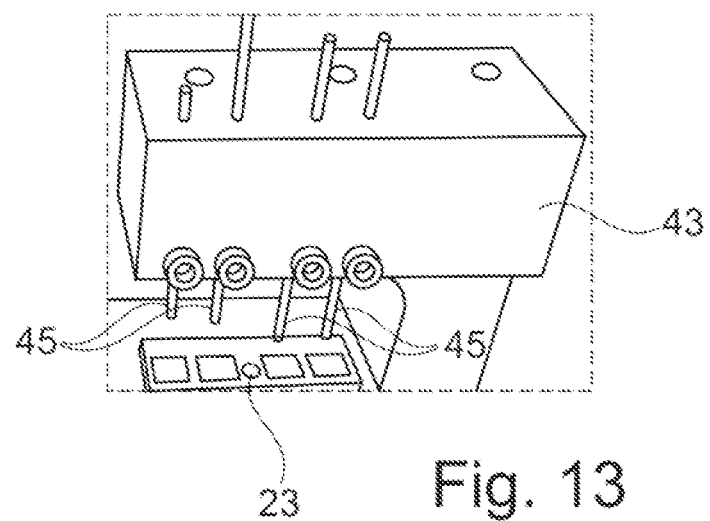
FIG. 13 is a perspective view showing the implementation of the temperature reading by touch points which are supported by a support box fixed on the first gripping member and which are intended to come into contact with an electronic card fixed on the upper face of a rack.

FIG. 13 shows in detail the arrangement of the touch points 45 in a box 43 and their placement opposite a printed circuit board 23 for temperature readings.

Figure 14:
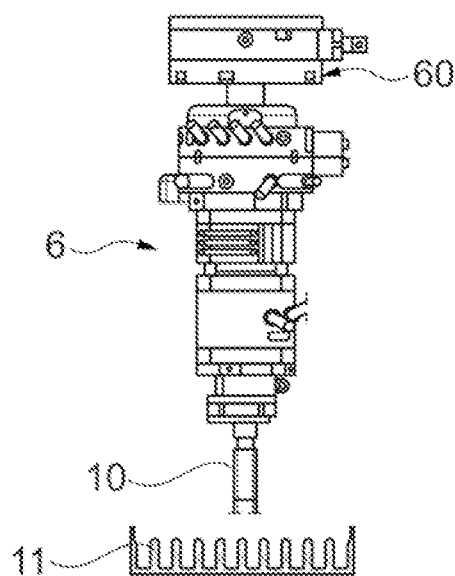
FIG. 14 is a perspective view of the second gripping member of the installation according to the invention, in gripping operation of a sample container (tube) individually.
Figure 15:
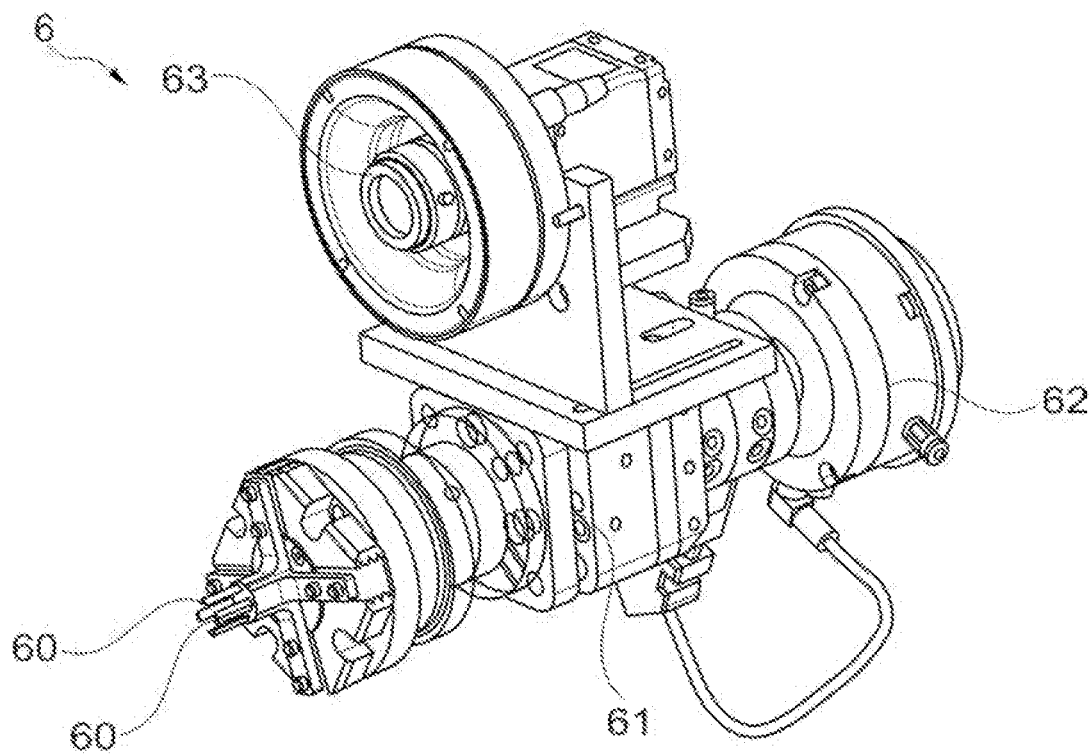
FIG. 15 is a perspective view of the second gripping member of the installation according to the invention, with all its components for the removal of sample tubes individually.

The second gripping member 6 is shown in more detail in FIGS. 14 and 15.

It comprises a grip with one or more gripping fingers 60, advantageously three concentric gripping fingers arranged at 120° to each other.

To grip a sample tube 10, the fingers 60 are brought together and locked around a tube 10 or inside the cap placed at the end of the tube.

In order to compensate for positioning errors and geometric variations of the parts along the X, Y and Z axes (manufacturing tolerance of the tubes 10, boxes 11), the gripping member 6 also comprises a force-free compliance module/body 61, preferably of the type with integrated return springs, arranged above the grip.

The gripping member 6 furthermore comprises an anti-collision system 62 to avoid undesired contact/collision with another component as well as a laser or camera vision learning system 63 which makes it possible to learn the pick-up/set-down points of the different objects to be handled, by laser or image.

Figure 16:
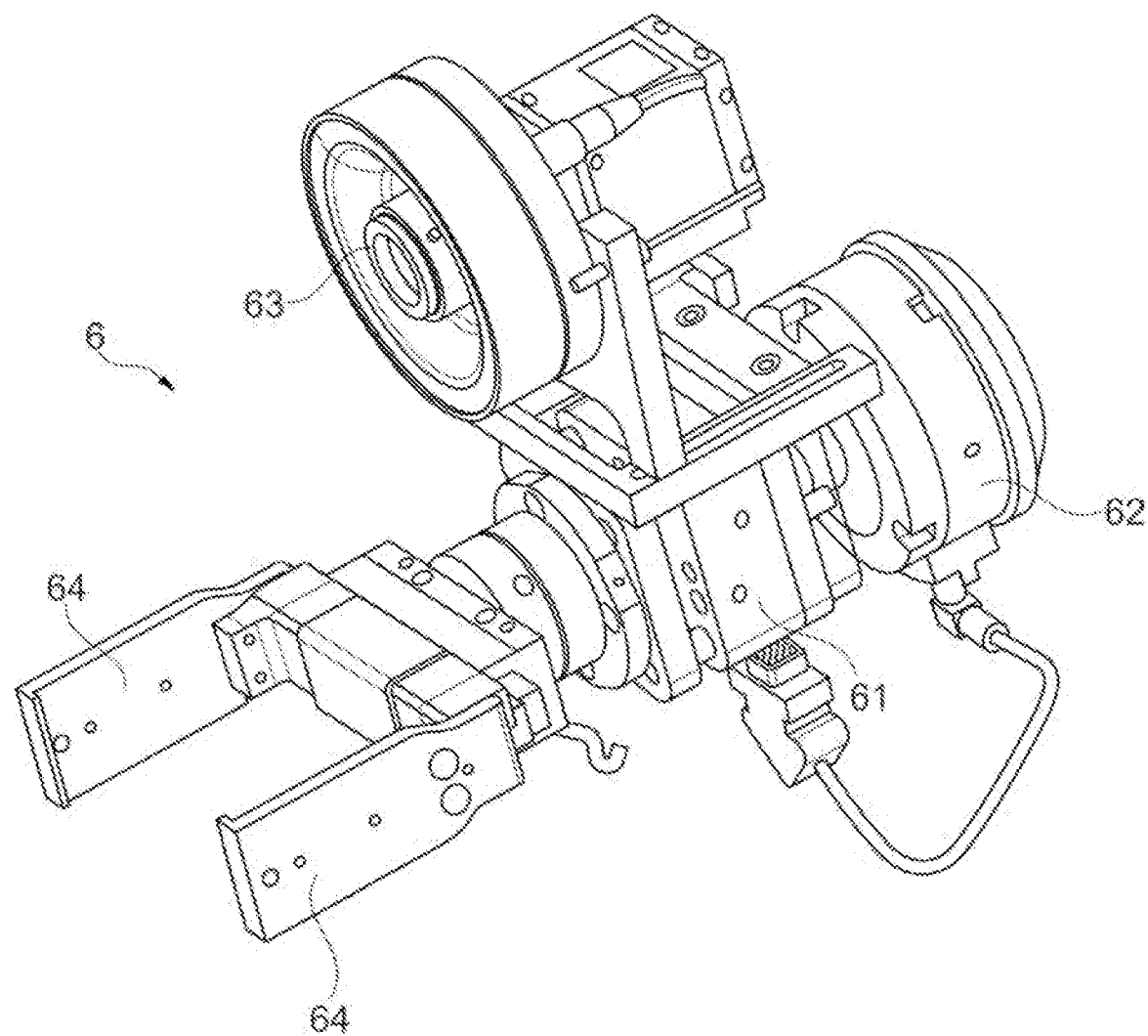
FIG. 16 is a perspective view illustrating a variant of the second gripping member of the installation according to the invention, with all its components for the removal individually of boxes containing a plurality of sample containers (tubes).

FIG. 16 shows an alternative design of the gripping member 6 in which the gripping fingers 60 are replaced by jaws 64 of the type used for the gripping member 4 of the Cartesian robot. With these jaws 64, boxes containing a plurality of sample tubes can be gripped individually instead of the sample tubes retrieved individually with the fingers 60.

The individual operating steps of the installation 1 according to the invention implemented by one or more control units and storage containers 3.1 to 3.10 will now be described, respectively for an operation of removing one or more sample containers (tubes) 10 individually from their storage to the outside of the installation enclosure and conversely for depositing one or more sample containers (tubes) individually from the outside of the enclosure into a storage container.

An operator makes a request to deposit one or more samples individually to the control unit of the installation 1 via an HMI (Human Machine Interface).

The control unit database checks that the specified sample tube location(s) 10 are available in one of the racks 2 of one of the containers 3.1 to 3.10.

Figure 17:
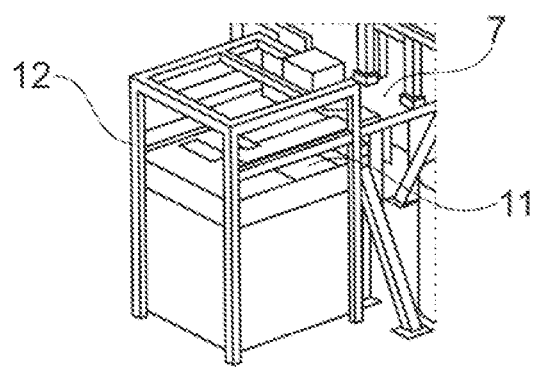
FIG. 17 is a perspective view of a portion of an installation according to the invention illustrating a step of depositing one or more samples to be preserved in a cryogenic storage container.
Figure 18:
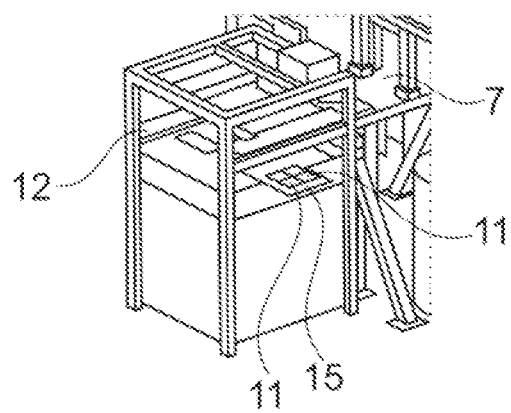
FIG. 18 is a perspective view of a portion of an installation according to the invention illustrating a step of depositing one or more samples to be preserved in a cryogenic storage container.

The operator then opens the loading drawer 15, places the sample container(s) 10 in one or more transfer boxes 11 and closes the drawer 15 (FIGS. 17 and 18).

If necessary, a barcode reader (not shown), placed under the storage zone of the transfer boxes 11, scans a code on the sample tube 10.

Figure 19:
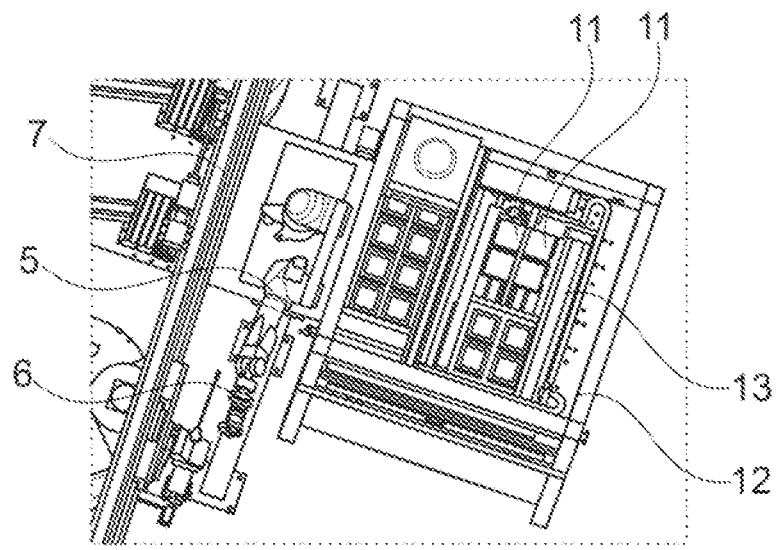
FIG. 19 is a perspective view of a portion of an installation according to the invention illustrating a step of depositing one or more samples to be preserved in a cryogenic storage vessel.
Figure 20:
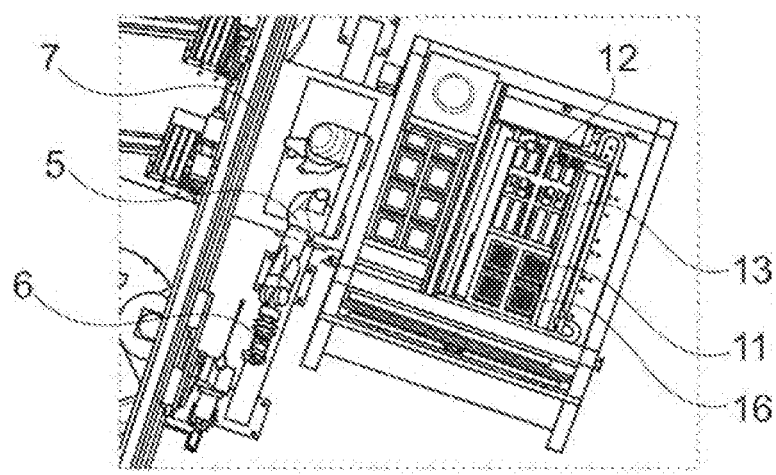
FIG. 20 is a perspective view of a portion of an installation according to the invention illustrating a step of depositing one or more samples to be preserved in a cryogenic storage vessel.

The second Cartesian robot 13 then transfers the transfer box(es) 11 placed on the loading drawer 15 to the static transfer tray 16, preferably supplied with liquid nitrogen (FIGS. 19 and 20).

Figure 21:
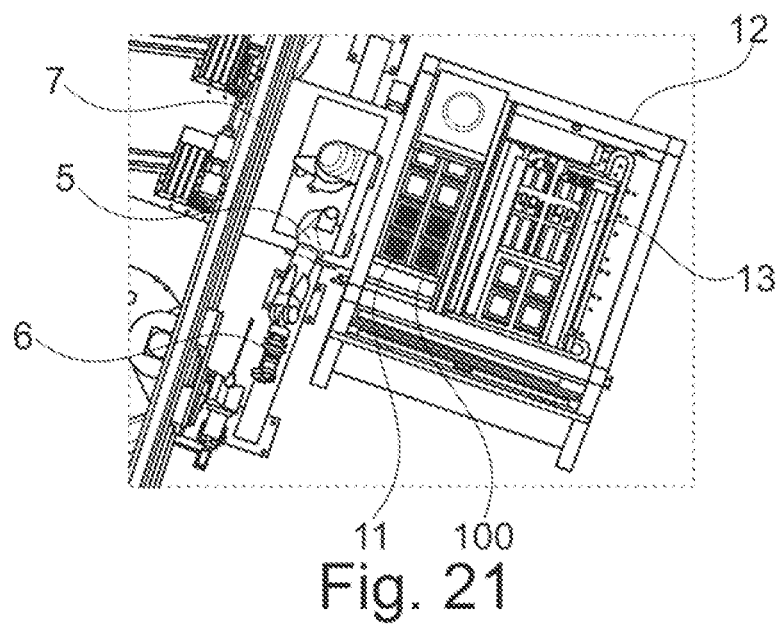
FIG. 21 is a perspective view of a portion of an installation according to the invention illustrating a step of depositing one or more samples to be preserved in a cryogenic storage vessel.

The second Cartesian robot 13 performs the transfer of the transfer box(es) 11 placed in the static transfer tray 16 into the transfer tray 100 in the first Cartesian robot 7 (FIG. 21).

Figure 22:
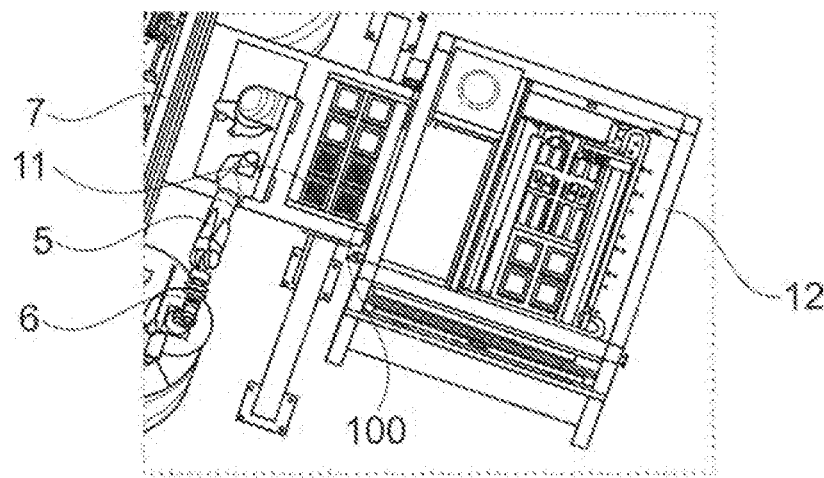
FIG. 22 is a perspective view of a part of an installation according to the invention illustrating a step of depositing one or more samples to be preserved in a cryogenic storage container.
Figure 23:
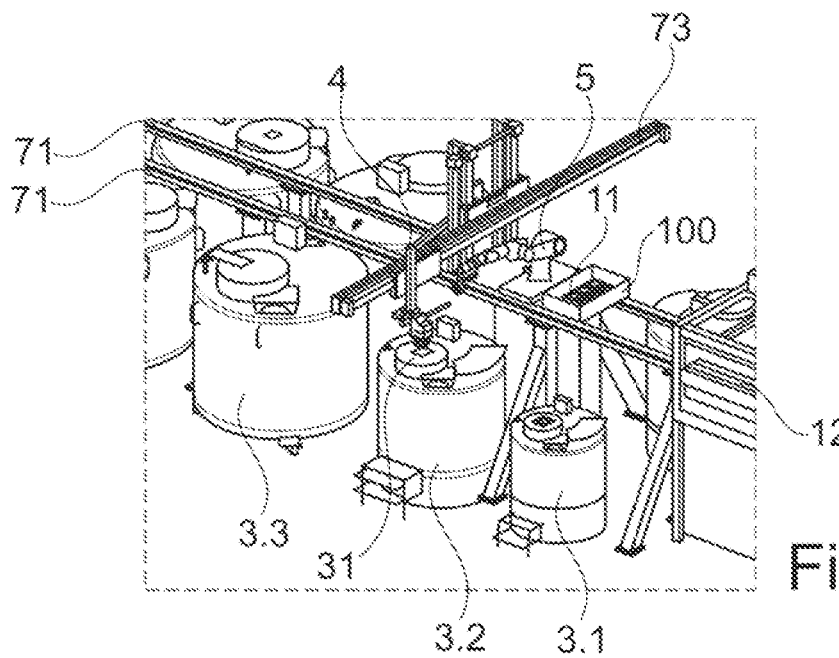
FIG. 23 is a perspective view of a portion of an installation according to the invention illustrating a step of depositing one or more samples to be preserved in a cryogenic storage container.

The latter then performs a longitudinal movement X and lateral movement Y, which brings the transfer tray 100 out of the preparation station 12 (FIG. 22) and then close to the selected storage container (cryo-storage container) 3.2 (FIG. 23).

Figure 24:
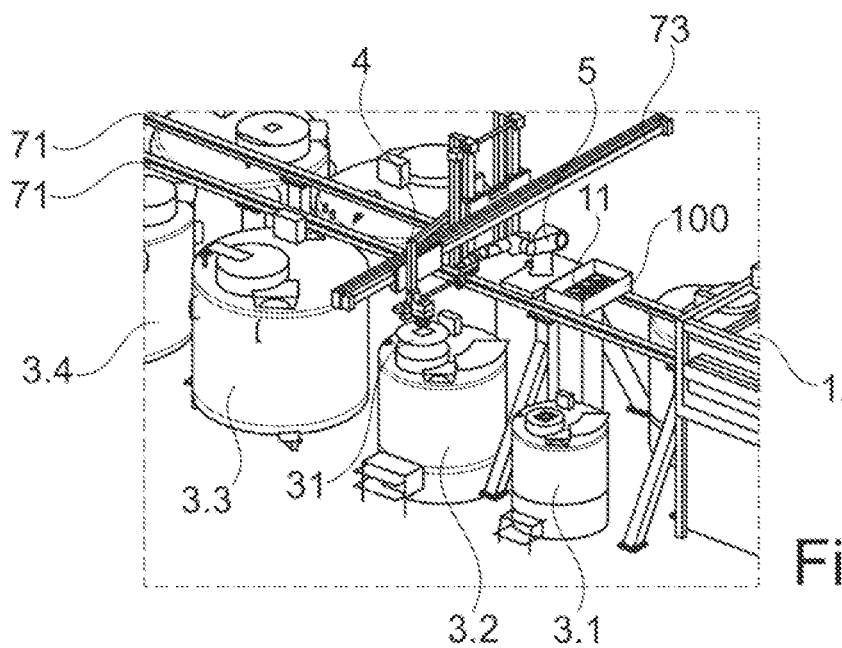
FIG. 24 is a perspective view of a portion of an installation according to the invention illustrating a step of depositing one or more samples to be preserved in a cryogenic storage container.
Figure 25:
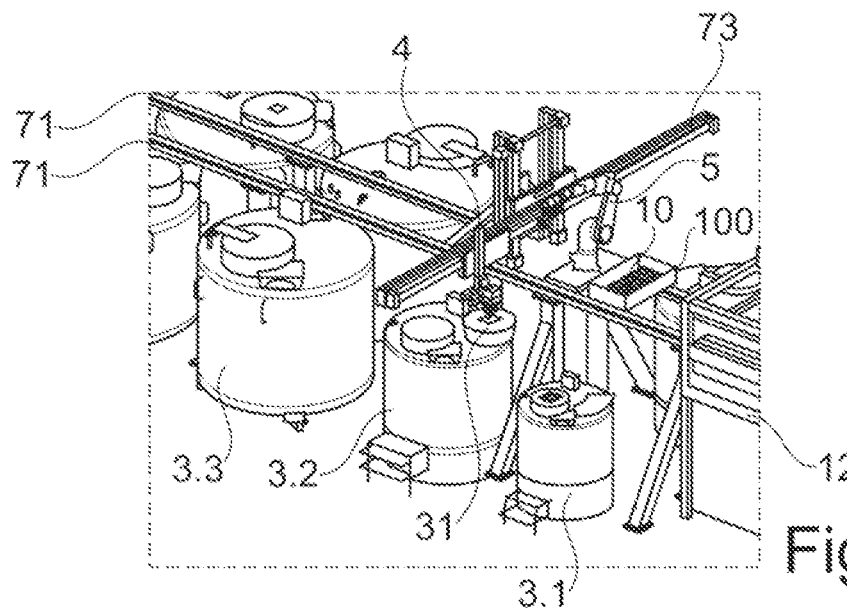
FIG. 25 is a perspective view of a portion of an installation according to the invention illustrating a step of depositing one or more samples to be preserved in a cryogenic storage container.

The gripping member 4 then removes the cap 31 from the selected cryo-storage container 3.2 (FIGS. 23 to 25). For the removal of a partial-opening cap 31, the Cartesian robot 7 performs a vertical downward movement (FIG. 23), then a gripping of the cap 31 by the gripping member (FIG. 24), a vertical upward movement, then a lateral movement, a vertical downward movement and finally a setting down of the cap (FIG. 25).

If the cryo-storage container is a fully open container, only electrical control by the control unit of the installation or the Cartesian robot 7 is necessary.

Figure 26:
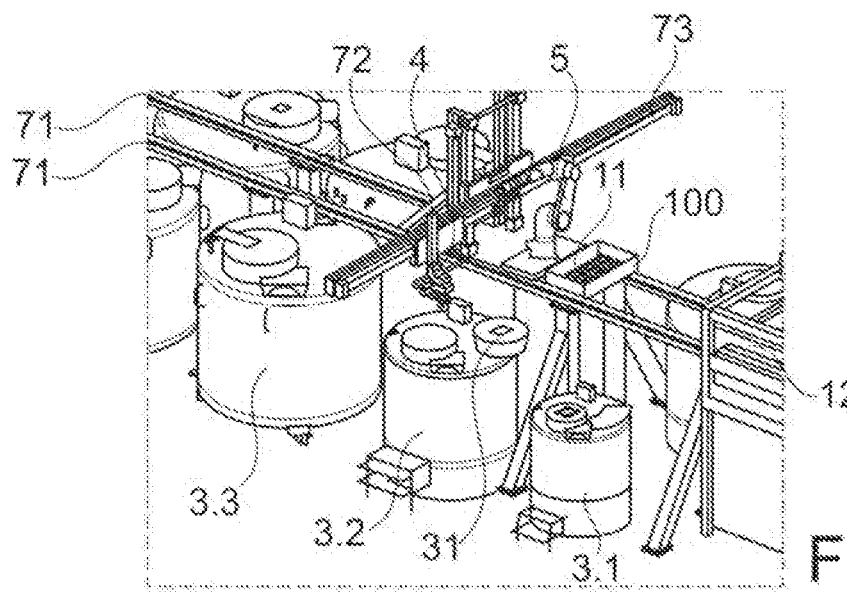
FIG. 26 is a perspective view of a portion of an installation according to the invention illustrating a step of depositing one or more samples to be preserved in a cryogenic storage vessel.
Figure 27:
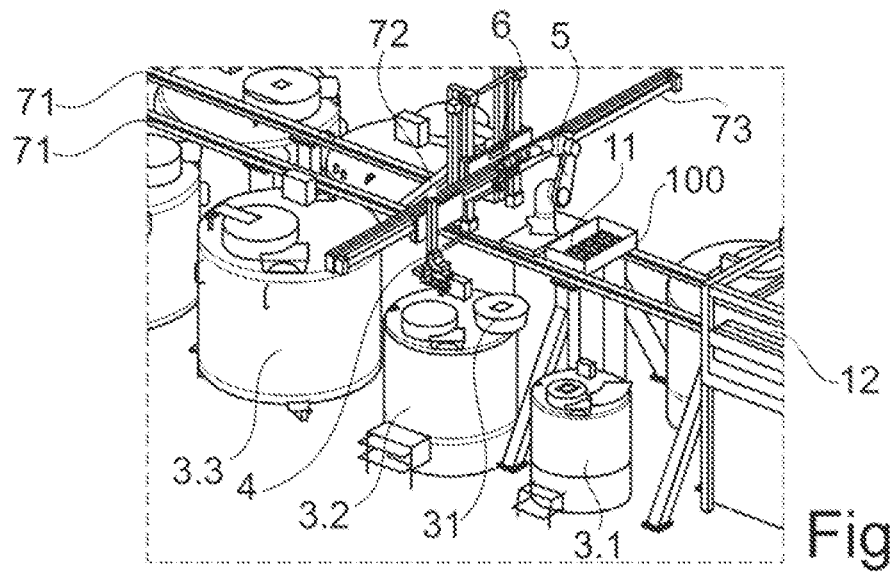
FIG. 27 is a perspective view of a portion of an installation according to the invention illustrating a step of depositing one or more samples to be preserved in a cryogenic storage container.

The gripping member 4 is then positioned vertically on the target rack 2 by moving the Cartesian robot 7 along its vertical axis 73 (FIGS. 26 and 27).

Figure 28:
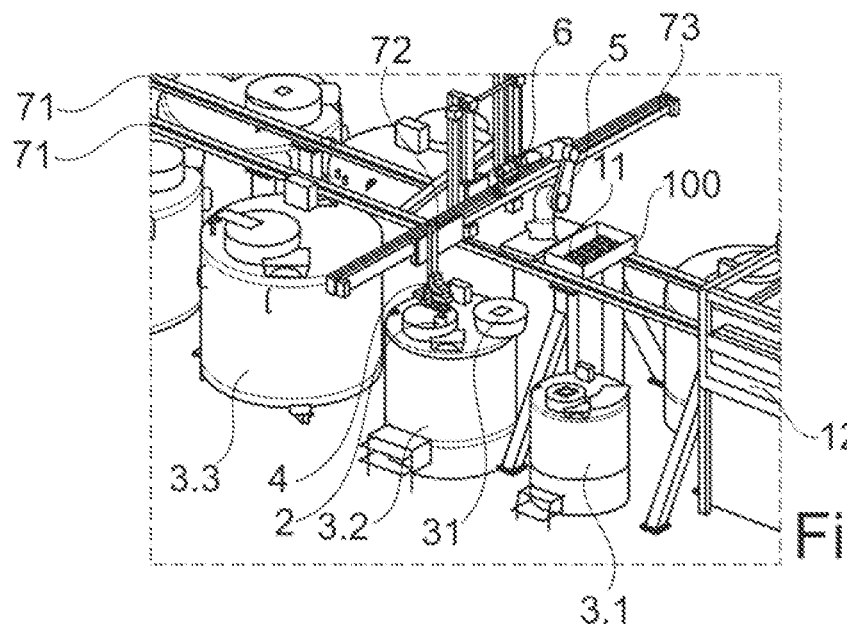
FIG. 28 is a perspective view of a portion of an installation according to the invention illustrating a step of depositing one or more samples to be preserved in a cryogenic storage container.

The gripping device 4 then grips the selected rack 2 (FIG. 28) and the temperature of the rack 2 is measured at least by means of the temperature sensors 21 and 22.

Figure 29:
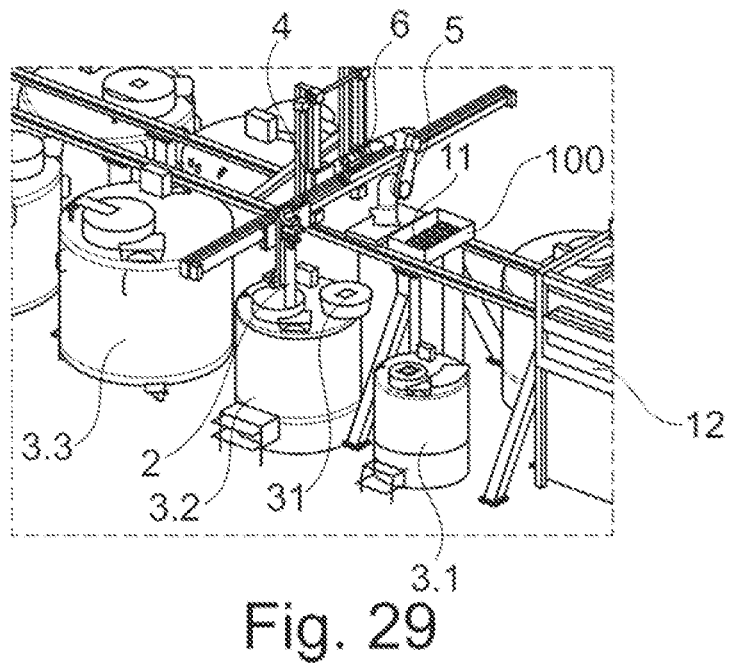
FIG. 29 is a perspective view of a portion of an installation according to the invention illustrating a step of depositing one or more samples to be preserved in a cryogenic storage container.

The rack 2 is then retrieved by vertical translation only of the Cartesian robot 7 (FIG. 29). During this retrieval time, the temperatures are measured continuously.

Figure 30:
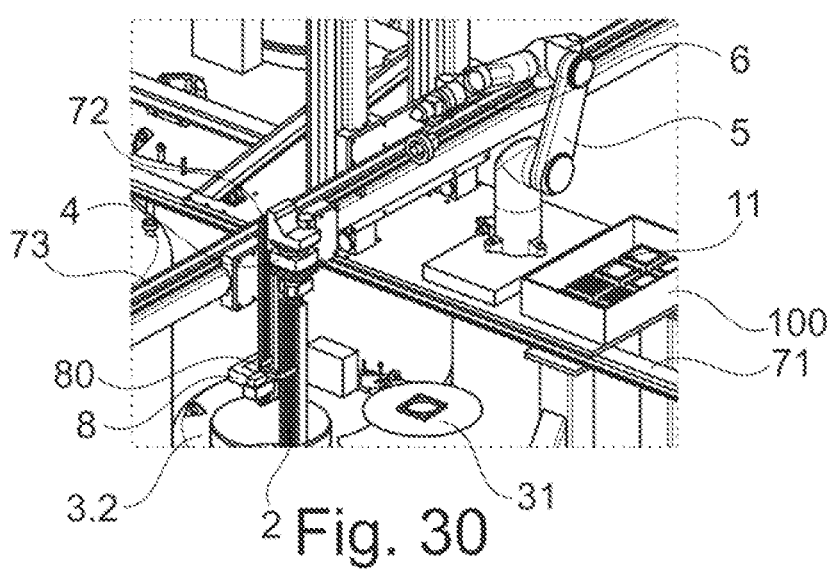
FIG. 30 is a perspective view of a portion of an installation according to the invention illustrating a step of depositing one or more samples to be preserved in a cryogenic storage container.
Figure 31:
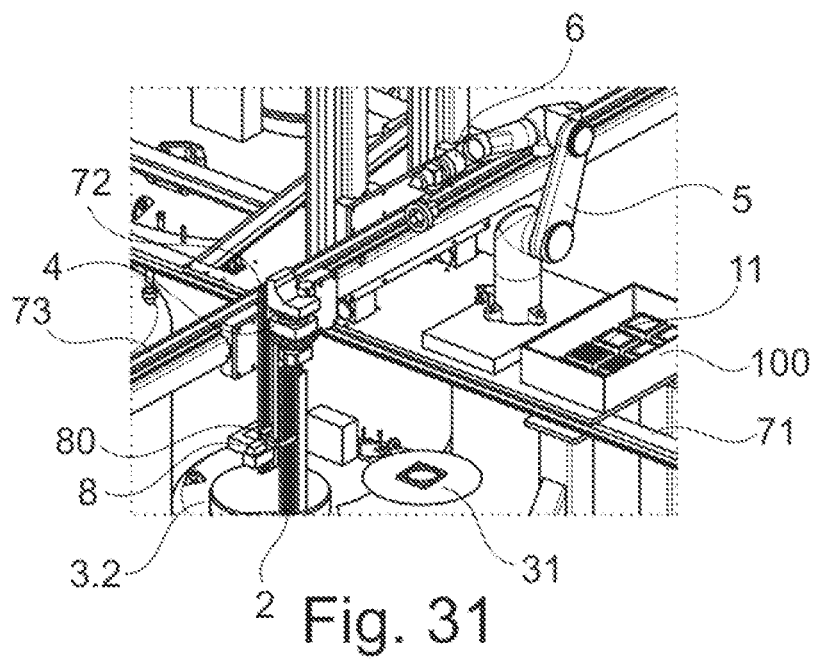
FIG. 31 is a perspective view of a portion of an installation according to the invention illustrating a step of depositing one or more samples to be preserved in a cryogenic storage container.
Figure 32:
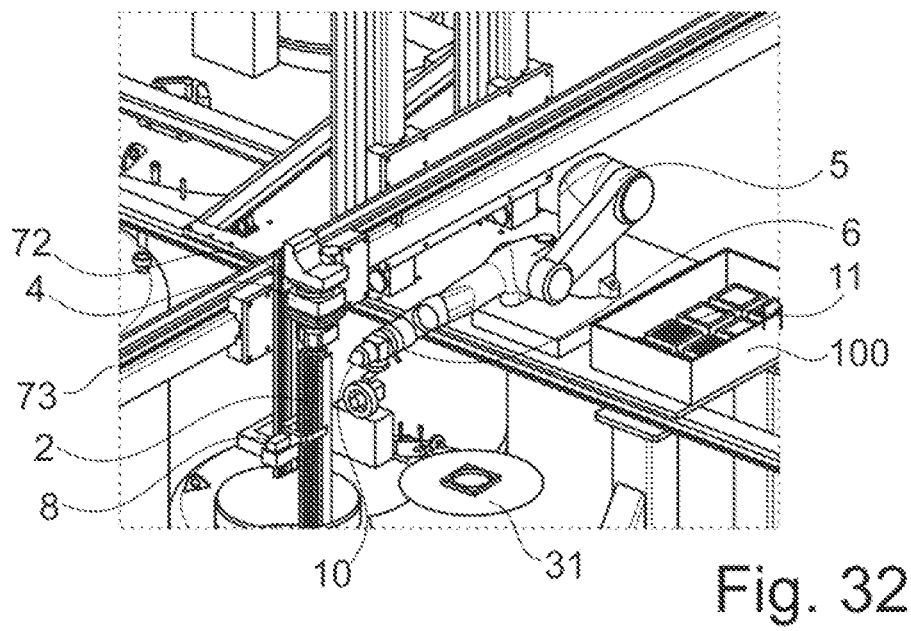
FIG. 32 is a perspective view of a portion of an installation according to the invention illustrating a step of depositing one or more samples to be preserved in a cryogenic storage container.

Then, the clamping device 8 is moved (FIGS. 30 and 31) and actuated in order to clamp the rack 2 in its retrieval position by the clamp 80 (FIG. 32).

Figure 33:
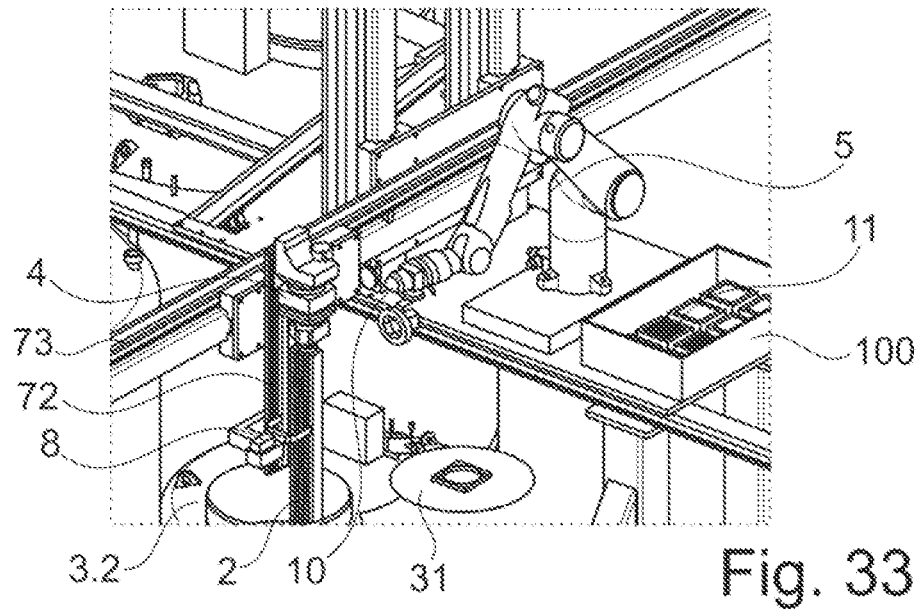
FIG. 33 is a perspective view of a portion of an installation according to the invention illustrating a step of depositing one or more samples to be preserved in a cryogenic storage container.
Figure 34:
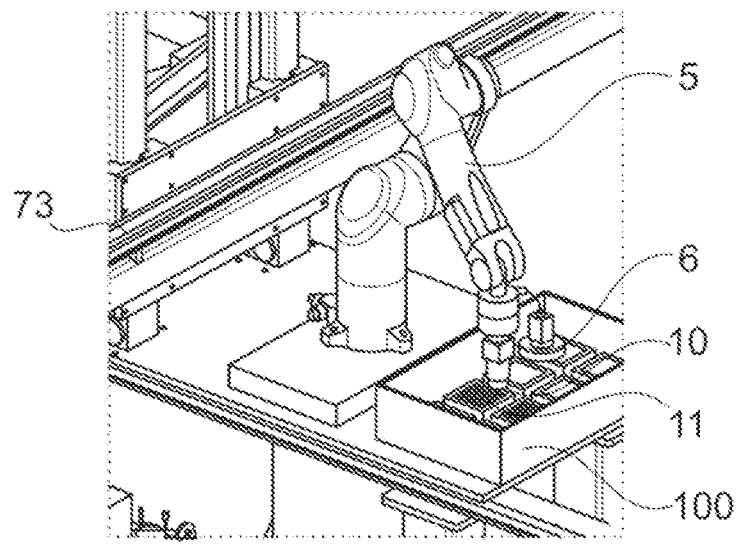
FIG. 34 is a perspective view of a portion of an installation according to the invention illustrating a step of depositing one or more samples to be preserved in a cryogenic storage container.

In this retrieved and clamped position of the rack 2, the gripping member 6 at the end of the six-axis robot arm 5 retrieves the desired sample tube(s) 10 from the honeycomb structure 20 and then brings them individually into the transfer box 11 placed in the transfer tray 100 (FIGS. 33 and 34). Conversely, the gripping member 6 can pick up other samples 10 already present in one or more of the transfer boxes 11 and place them in the rack 2 in the retrieved and clamped position.

During these operations, the six-axis robot 5 is guided by camera assistance and the control unit integrates compensation coefficients, associated with the temperature readings taken, in order to make the necessary movement corrections. Also during these operations, the transfer tray 100 is continuously supplied with liquid nitrogen to keep at very low temperature the transfer boxes 11 and the sample tubes 10 placed inside.

If necessary, at this stage a barcode reading is performed on the sample tubes in order to identify them.

Figure 35:
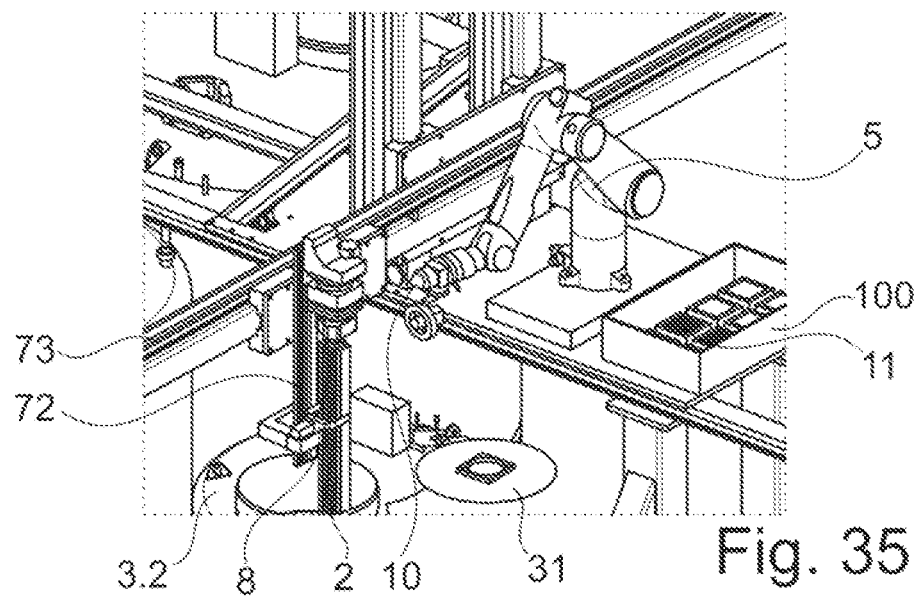
FIG. 35 is a perspective view of a portion of an installation according to the invention illustrating a step of depositing one or more samples to be preserved in a cryogenic storage container.
Figure 36:
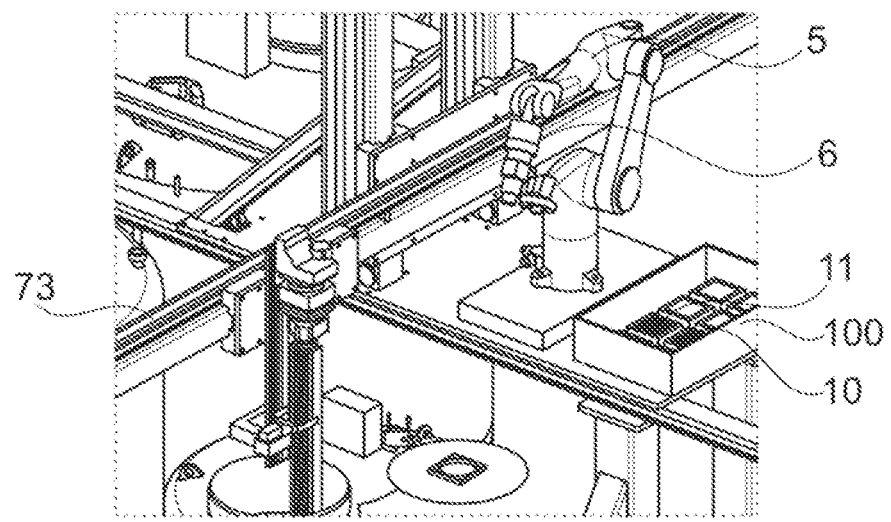
FIG. 36 is a perspective view of a portion of an installation according to the invention illustrating a step of depositing one or more samples to be preserved in a cryogenic storage container.
Figure 37:
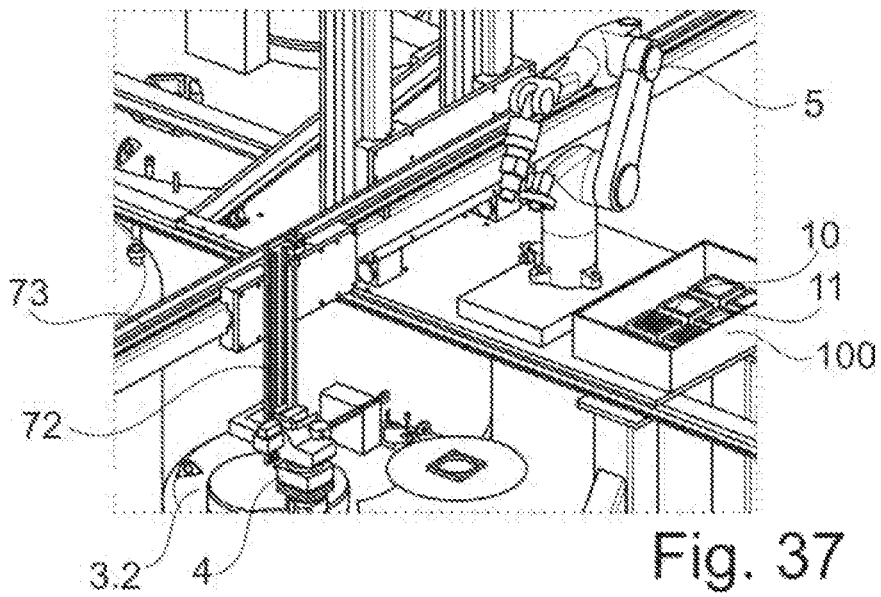
FIG. 37 is a perspective view of a portion of an installation according to the invention illustrating a step of depositing one or more samples to be preserved in a cryogenic storage container.
Figure 38:
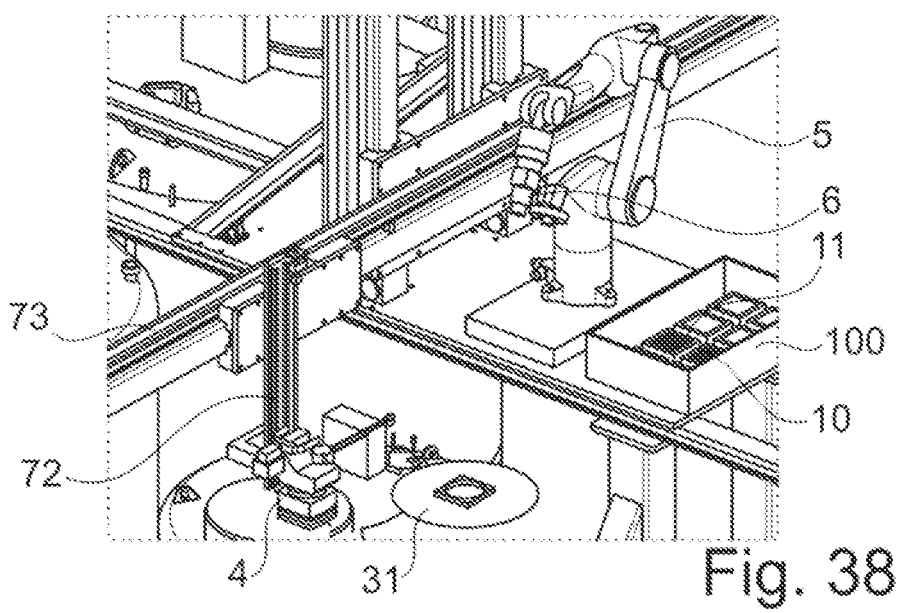
FIG. 38 is a perspective view of a portion of an installation according to the invention illustrating a step of depositing one or more samples to be preserved in a cryogenic storage container.
Figure 39:
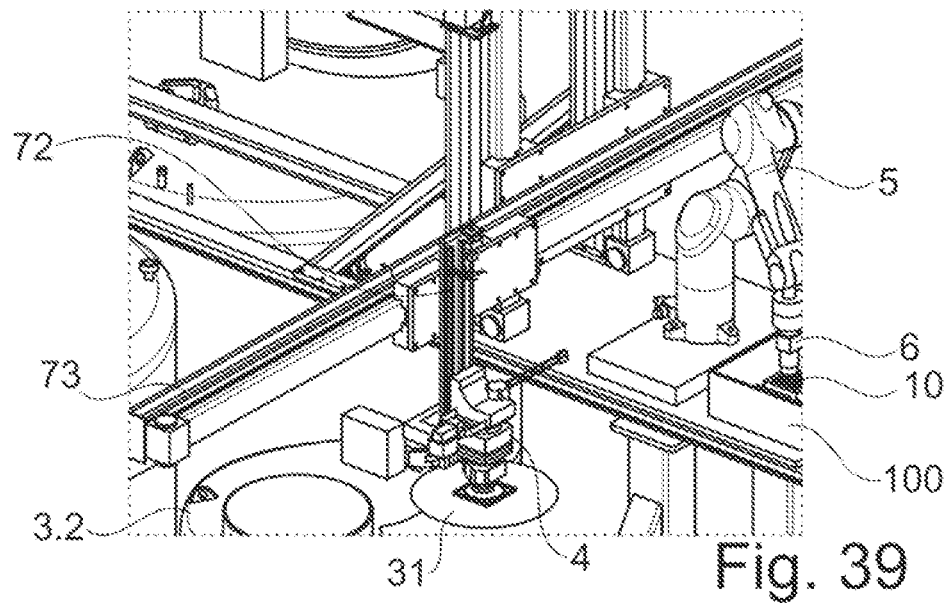
FIG. 39 is a perspective view of a portion of an installation according to the invention illustrating a step of depositing one or more samples to be preserved in a cryogenic storage container.
Figure 40:
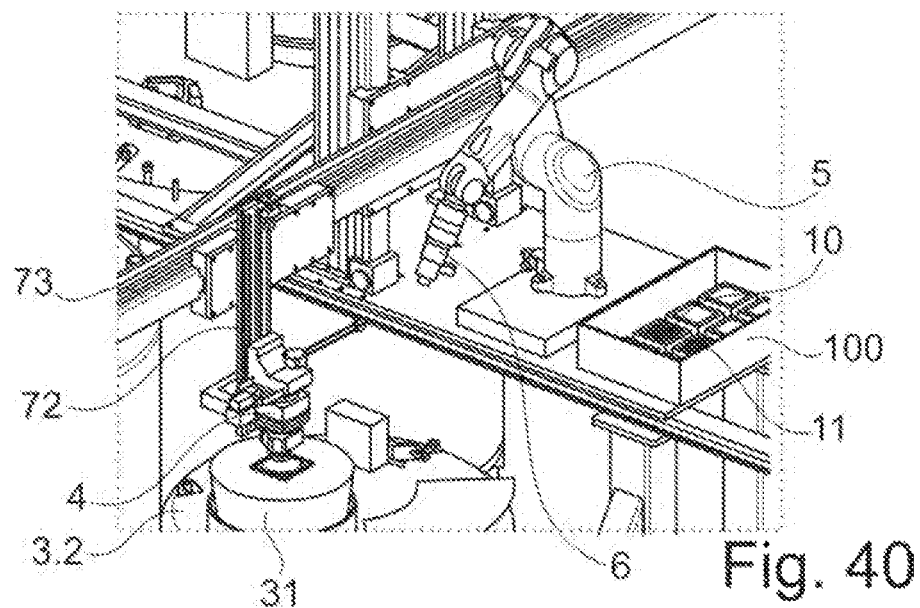
FIG. 40 is a perspective view of a portion of an installation according to the invention illustrating a step of depositing one or more samples to be preserved in a cryogenic storage vessel.
Figure 41:
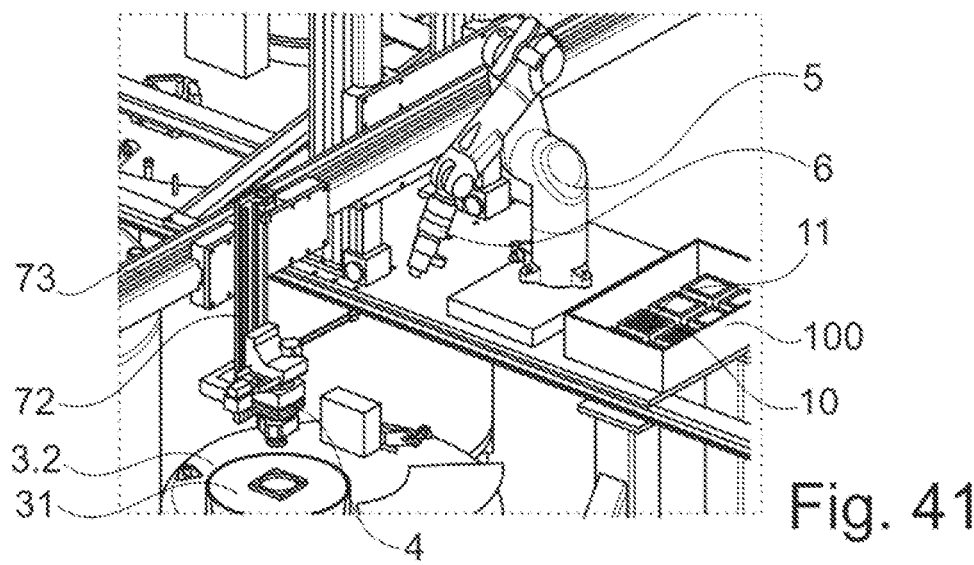
FIG. 41 is a perspective view of a portion of an installation according to the invention illustrating a step of depositing one or more samples to be preserved in a cryogenic storage vessel.

Once the sample tubes 10 have been taken and placed in the transfer box(es) 1 and the necessary ones stored in the cells 200 of the rack 2, the Cartesian robot 7 proceeds to put the rack 2 back into place in the cryo-storage container 3.2 by unclamping the grip 80 and then moving it vertically downwards by the movement axis 73 (FIGS. 35 to 37). This operation of putting the rack 2 back in the cryo-storage container before clamping and/or after unclamping can also be carried out if the measurement of the temperatures of the rack 2 indicates that at least one of the temperatures is too high.

The cap 31 of the cryo-storage container 3.2 is then replaced using the Cartesian robot 7 (FIGS. 38 to 41) or by closing the lid 31 of the cryo-storage container 3.2 by electrical control in the case of a full-opening container.

Figure 42:
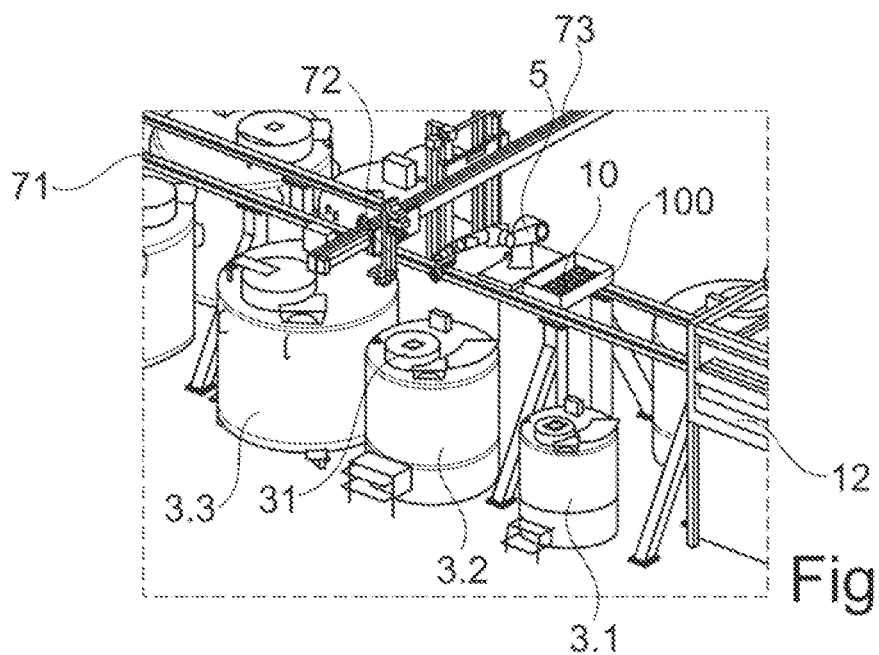
FIG. 42 is a perspective view of a portion of an installation according to the invention illustrating a step of depositing one or more samples to be preserved in a cryogenic storage vessel.
Figure 43:
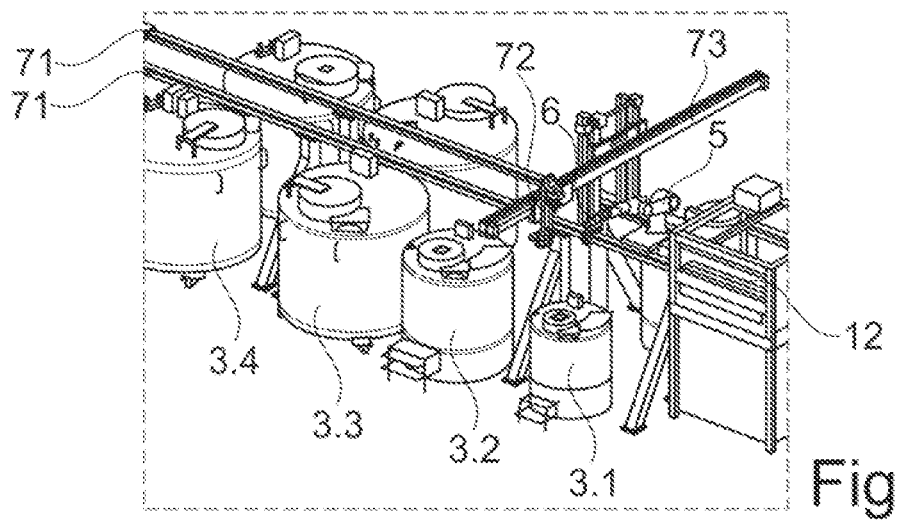
FIG. 43 is a perspective view of a portion of an installation according to the invention illustrating a step of depositing one or more samples to be preserved in a cryogenic storage vessel.

The control unit then controls the movement of the robot 7 to another cryo-storage container or in the preparation station 12 with a view to returning to the docking zone (FIGS. 42 and 43).

Figure 44:
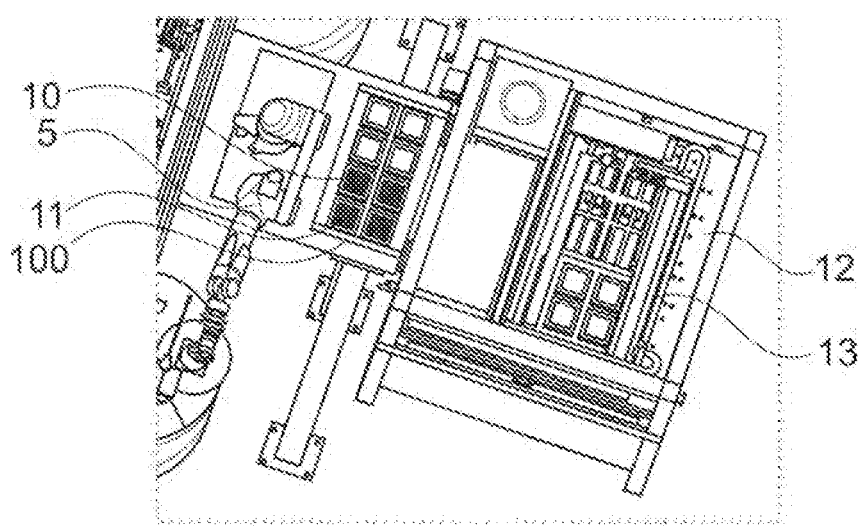
FIG. 44 is a perspective view of a portion of an installation according to the invention illustrating a step of depositing one or more samples to be preserved in a cryogenic storage container.
Figure 45:
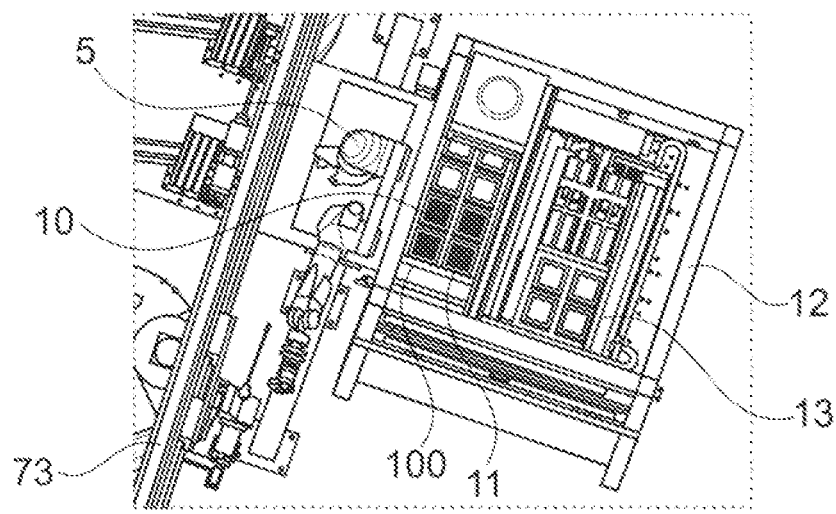
FIG. 45 is a perspective view of a portion of an installation according to the invention illustrating a step of depositing one or more samples to be preserved in a cryogenic storage container.
Figure 46:
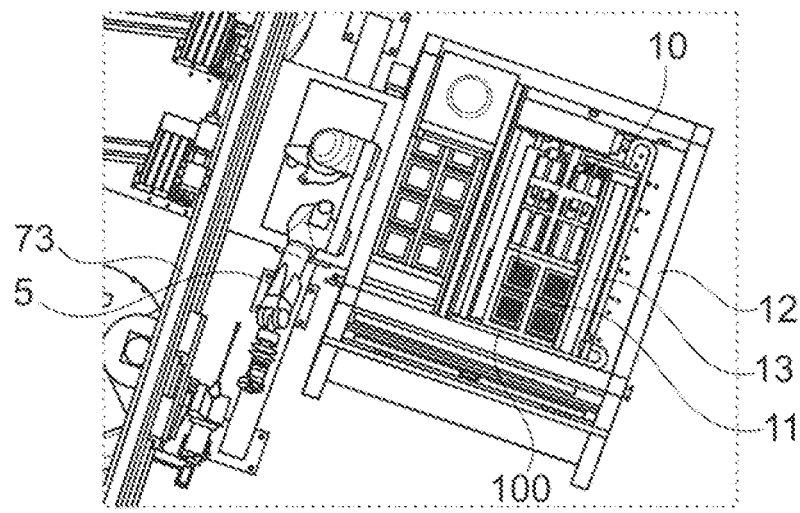
FIG. 46 is a perspective view of a portion of an installation according to the invention illustrating a step of depositing one or more samples to be preserved in a cryogenic storage vessel.

The Cartesian robot 13 then returns the empty transfer boxes 11 or those containing retrieved sample tubes 10 that are in the transfer tray 100 to the loading drawer 15 (FIGS. 44-46).

Figure 47:
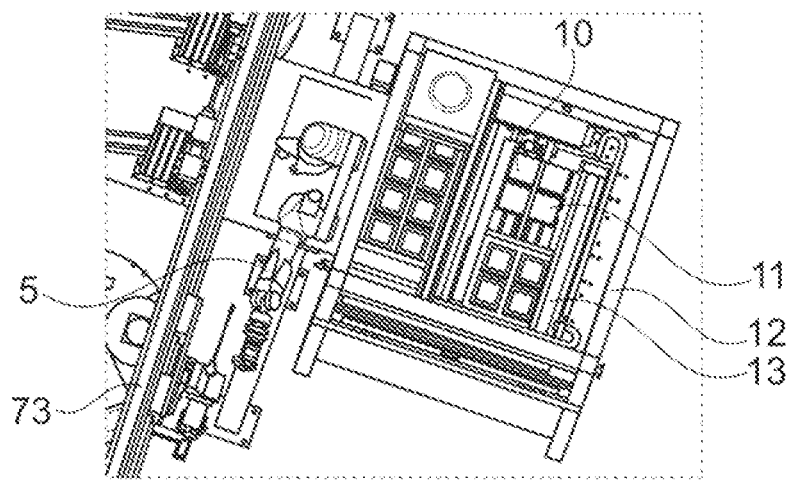
FIG. 47 is a perspective view of a portion of an installation according to the invention illustrating a step of depositing one or more samples to be preserved in a cryogenic storage container.
Figure 48:
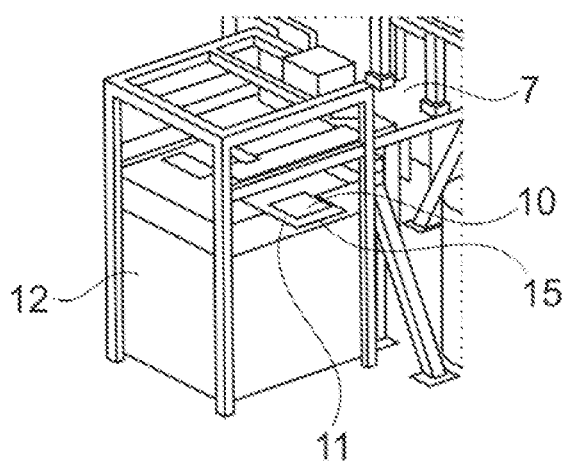
FIG. 48 is a perspective view of a portion of an installation according to the invention illustrating a step of depositing one or more samples to be preserved in a cryogenic storage container.

When the operator makes a request to retrieve the transfer boxes 11, the Cartesian robot 13 comes to remove them from the loading drawer (FIGS. 47 and 48).

Other variants and improvements can be envisaged without departing from the scope of the invention.

For example, if in the illustrated embodiments the Cartesian robot is carried by a ground frame, it can just as easily be suspended from the ceiling by a suitable gantry.

Figure 49:
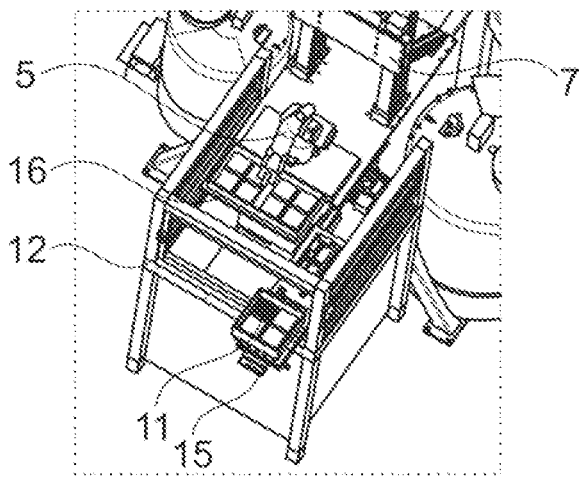
FIG. 49 is a perspective view of a part of an installation according to the invention illustrating a variant of the steps performed in the preparation station of the installation.
Figure 50:
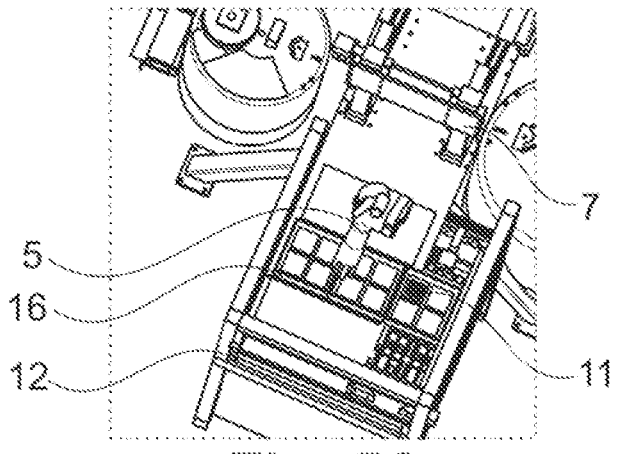
FIG. 50 is a perspective view of a part of an installation according to the invention illustrating an alternative of the steps performed in the preparation station of the installation.
Figure 51:
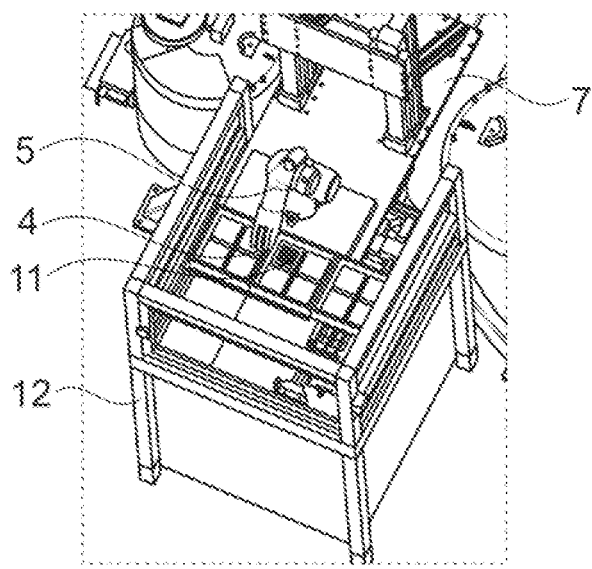
FIG. 51 is a perspective view of apart of an installation according to the invention illustrating a variant of the steps performed in the preparation station of the installation.

Another variant is illustrated in FIGS. 49 to 51, where the Cartesian robot 13 is replaced by the six-axis robot 5 itself. In other words, according to this variant, the preparation station 12 no longer comprises its own Cartesian robot 13, the functions of the latter being replaced by the six-axis robot 5, which, once docked in its docking zone near the preparation station 12, carries out the operations of taking sample tubes 10 and transferring the transfer boxes 11 placed in the static transfer tray 16 to the transfer tray 100 of this robot by means of the gripping member 4 that it carries, as explained with reference to FIGS. 17 to 21, or vice versa.

Figure 52:
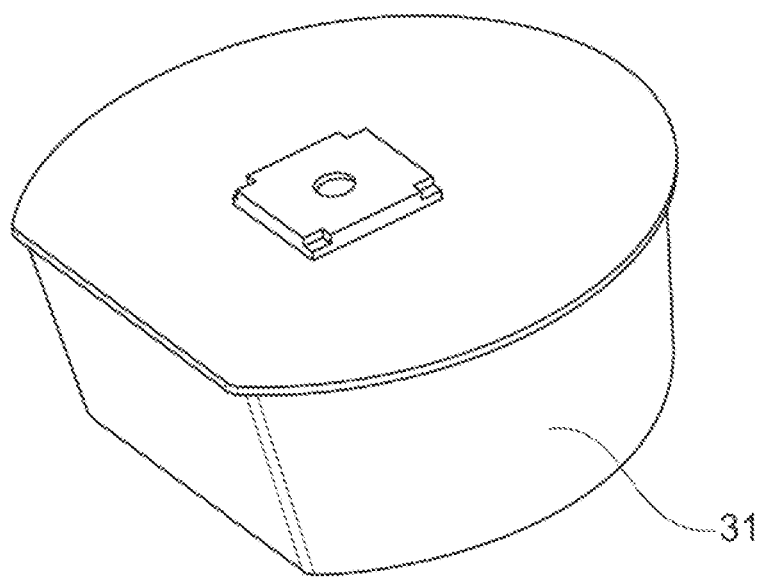
FIG. 52 is a perspective view of a modified cap of a partial-opening vessel (cryo-storage container) of the installation according to the invention.
Figure 53:
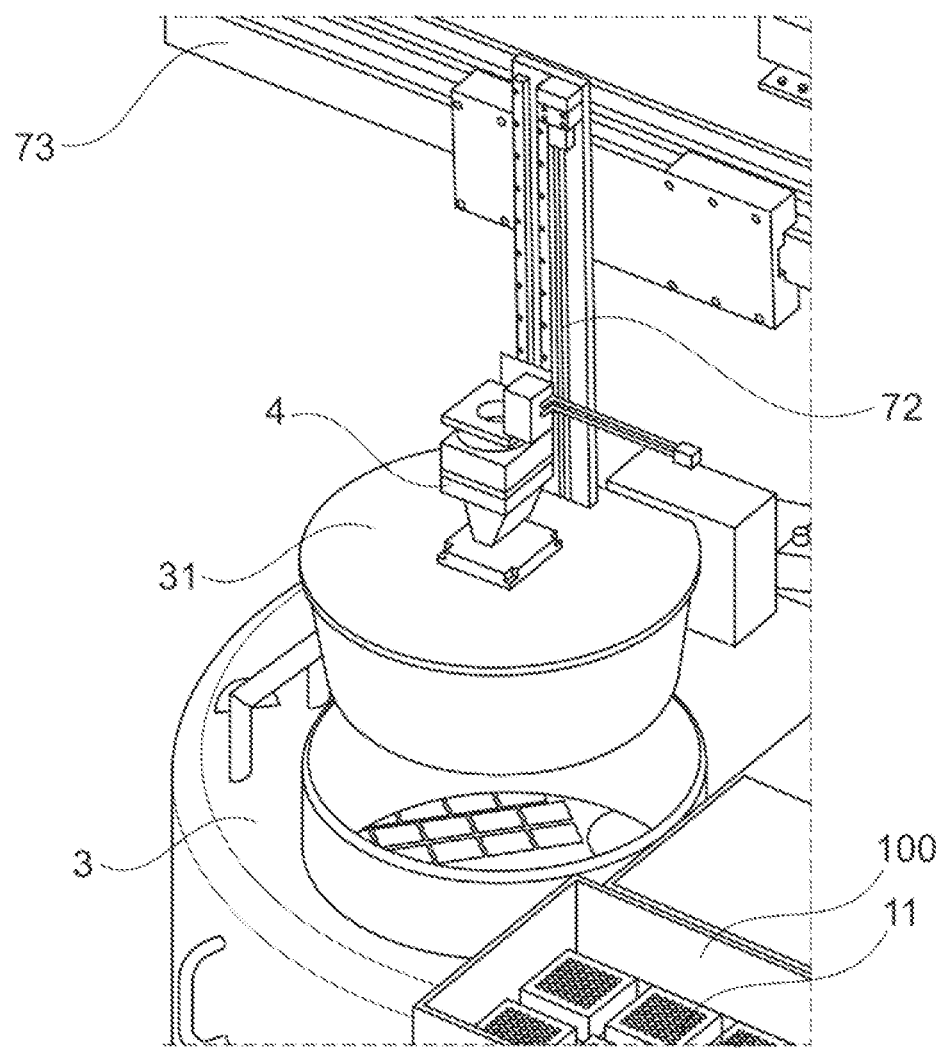
FIG. 53 is a perspective view showing the opening of the modified cap according to FIG. 52 of a partial-opening tank (cryo-storage container) by means of the Cartesian robot of the installation according to the invention.

FIGS. 52 and 53 show yet another example of a modification that can be made to the installation without departing from the scope of the invention. Here, the cap 31 of a partial-opening vessel (cryo-storage container) is modified. As shown in FIG. 53, the gripping member 4 performs the removal and gripping of the partial-opening cap 31 by the Cartesian robot 7, which performs a vertical downward movement. A vertical upward movement allows the cap 31 to be lifted.

The invention claimed is:

1. An installation for handling and storing biological samples at very low temperatures comprising:
   a plurality of storage columns, each extending along a longitudinal axis (Z1) and having a structure adapted to receive translationally and to house a plurality of containers each adapted to contain one or more biological samples;
   a plurality of thermally insulated storage containers aligned in at least one row, the interior of each container being able to be subjected to very low temperatures, each container comprising in its upper part a honeycomb grid, each cell of which is adapted to receive vertically one of the plurality of storage columns;
   a first gripping member, adapted to grip a storage column individually;
   an articulated-arm robot with at least five degrees of freedom, said robot having at least five axes, the robot arm being adapted to move in any position within a circular zone of movement, the end of the robot arm being provided with a second gripping member, adapted to grip a sample container or a multi-compartment storage box individually, each compartment being able to house a container;
   a first Cartesian robot, arranged above the row(s) of storage containers, the first Cartesian robot having at least two axes: a longitudinal movement axis (X), which is parallel to the direction of alignment of the row(s), and a vertical movement axis (Z); the first Cartesian robot being adapted to carry and move, along its longitudinal movement axis, the at least five-axis robot, and to carry and move vertically, the first gripping member;
   the installation being configured so that:
   i/the first Cartesian robot can move the at least five-axis robot in the vicinity of any of the storage containers,
   ii/the first gripping member retrieves vertically at least partially any one of the columns from one of the cells of the storage container grid in a so-called pick-up position,
   iii/the second gripping member retrieves at least one selected container in the pick-up position of the column,
   and vice versa.

2. The installation as claimed in claim 1, the articulated-arm robot being a five-, six-or seven-axis robot.

3. The installation as claimed in claim 1, wherein the storage containers are aligned in two parallel rows delimiting a space in which the longitudinal movement axis/axes of the first Cartesian robot is/are arranged.

4. The installation as claimed in claim 1, wherein:
   the structure of each storage column is a honeycomb structure of which the cells extend along an axis (Y1) intersecting the longitudinal axis (Z1), each cell of a storage column being adapted to receive and house one of the plurality of containers (T) individually;
   the second gripping member being adapted to grip a container individually,
   the installation being configured so that iii/the second gripping member retrieves any of the selected containers individually in the column pick-up position.

5. The installation as claimed in claim 4, comprising a clamping device, carried by the vertical movement axis of the Cartesian robot, the clamping device being adapted to clampingly hold a storage column when the latter is at least partially retrieved from a storage container.

6. The installation as claimed in claim 4, comprising a retrieval device, carried by the vertical movement axis of the Cartesian robot, the retrieval device being adapted to push any container from a cell of a storage column when said container is at least partially retrieved from a storage container.

7. The installation as claimed in claim 6, wherein the retrieval device comprises one or more cylinders as pushing means.

8. The installation as claimed in claim 1, wherein:
   the structure of each storage column is divided into a plurality of storage drawers, each adapted to receive translationally one of a plurality of the multi-compartment storage boxes, each compartment being adapted to house a container in each case adapted to contain a biological sample or samples;
   the second gripping member being adapted to grip a storage box individually;
   the installation being configured so that iii/the second gripping member retrieves any one of the selected storage boxes individually in the column pick-up position.

9. The installation as claimed in claim 1, wherein the first Cartesian robot is a three-axis robot, the third axis being a lateral movement axis adapted to laterally move the first gripping member at least in line with any cell of the grid of any of the storage containers.

10. The installation as claimed in claim 1, comprising:
    at least one transfer tray, carried by the longitudinal movement axis of the first Cartesian robot and arranged in the circular movement zone of the at least five-axis robot, the transfer tray being adapted to house a plurality of storage boxes,
    a preparation station from which an operator can bring one or more containers or one or more multi-compartment boxes,
    the installation being configured so that the longitudinal movement axis of the first Cartesian robot can move the transfer tray in the preparation station.

11. The installation as claimed in claim 10, wherein the preparation station comprises a second Cartesian robot with at least two axes, adapted to bring the containers or boxes into an airlock for the recovery of biological samples by an operator.

12. The installation as claimed in claim 1, comprising measurement instrumentation means installed on each storage column structure.

13. The installation as claimed in claim 12, wherein the instrumentation means comprise at least one temperature sensor and/or at least one strain gauge and/or a radio-frequency identification means (RFID) and/or a transponder.

14. The installation as claimed in claim 13, comprising at least two temperature sensors per storage column, one arranged at one longitudinal end and the other arranged at the opposite longitudinal end.

15. The installation as claimed in claim 1, comprising a floor or ceiling frame that carries the first Cartesian robot or a gantry that carries the first Cartesian robot, suspended above the row(s) of storage containers.

16. The installation as claimed in claim 1, comprising an enclosure with a controlled environment comprising secure access, in particular to the preparation station for an operator from the outside, the enclosure being configured to house the plurality of storage containers and boxes, the plurality of storage columns, the storage containers, the at least five-axis robot, the gripping members, the Cartesian robot(s) and, if necessary, the frame or the gantry.

17. The installation as claimed in claim 16, wherein the controlled environment is gaseous atmosphere and/or hygrometry and/or controlled temperature.

18. The installation as claimed in claim 1, the storage container(s) in each case comprise(s) a lid to close the container(s) which is (are) in storage configuration, that is to say not concerned by the retrieval or, conversely, the insertion of a column therein.

19. The installation as claimed in claim 18, wherein the control unit of the first Cartesian robot is adapted to control the opening and conversely the closing of each storage container.

20. The installation as claimed in claim 1, wherein the containers is (are) storage tubes.

21. The installation as claimed in claim 1, wherein the storage container(s) is (are) operated under cryogenic conditions.

22. Use of the installation as claimed in claim 1 for storing biological samples under cryogenic conditions in an environmentally controlled enclosure.

* * * * *